United States Patent
Yamazaki et al.

(10) Patent No.: US 7,560,660 B2
(45) Date of Patent: Jul. 14, 2009

(54) LASER IRRADIATION METHOD AND APPARATUS

(75) Inventors: Shunpei Yamazaki, Tokyo (JP); Koichiro Tanaka, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 685 days.

(21) Appl. No.: 11/219,677

(22) Filed: Sep. 7, 2005

(65) Prior Publication Data
US 2006/0009016 A1    Jan. 12, 2006

Related U.S. Application Data

(62) Division of application No. 10/457,778, filed on Jun. 10, 2003, now Pat. No. 6,984,573.

(30) Foreign Application Priority Data

Jun. 14, 2002    (JP) .............................. 2002-173599

(51) Int. Cl.
*B23K 26/16* (2006.01)
*B23K 26/06* (2006.01)

(52) U.S. Cl. .............................. 219/121.67; 219/121.76

(58) Field of Classification Search .. 219/121.6–121.86
See application file for complete search history.

(56) References Cited

U.S. PATENT DOCUMENTS 4,330,363 A    5/1982   Biegesen et al.
4,692,191 A    9/1987   Maeda et al.
4,861,964 A    8/1989   Sinohara (Continued)

FOREIGN PATENT DOCUMENTS

JP         62-104117         5/1987

(Continued)

OTHER PUBLICATIONS

Akito Hara et al., "High Performance Poly-Si TFTs on a Glass by a Stable Scanning CW Laser Lateral Crystallization", IEDM 01: Technical Digest of International Electron Devices Meeting; Jan. 1, 2001, pp. 747-750.

(Continued)

*Primary Examiner*—Sang Y Paik
(74) *Attorney, Agent, or Firm*—Nixon Peabody LLP; Jeffrey L. Costellia

(57) ABSTRACT

An objective of the present invention is to provide a laser crystallizing method capable of suppressing a thermal damage on a substrate as well as enhancing a substrate processing efficiency, and a laser irradiation apparatus using the laser crystallizing method. Laser lights oscillated from plural laser oscillating apparatuses are synthesized into one laser light and in a scanning direction of the laser light thus obtained, areas having an energy density lower than a predetermined level are cut with a slit. With the above construction, an average value of laser light energy densities can be increased in the scanning direction. Therefore, laser light irradiation time per area can be suppressed and in addition, a heat quantity applied to an object to be processed can be increased in total. Accordingly, a crystallinity of a semiconductor film can be increased while preventing the substrate from being excessively heated.

25 Claims, 21 Drawing Sheets

U.S. PATENT DOCUMENTS

| | | | |
|---|---|---|---|
| RE33,947 E | 6/1992 | Shinohara | |
| 5,225,886 A | 7/1993 | Koizumi et al. | |
| 5,365,875 A | 11/1994 | Asai et al. | |
| 5,591,668 A | 1/1997 | Maegawa et al. | |
| 5,708,252 A | 1/1998 | Shinohara et al. | |
| 6,059,873 A | 5/2000 | Yamaguchi et al. | |
| 6,149,988 A | 11/2000 | Shinohara et al. | |
| 6,176,922 B1 | 1/2001 | Aklufi et al. | |
| 6,261,856 B1 | 7/2001 | Shinohara et al. | |
| 6,365,933 B1 | 4/2002 | Yamazaki et al. | |
| 6,372,039 B1 | 4/2002 | Okumura et al. | |
| 6,393,042 B1 * | 5/2002 | Tanaka | 372/101 |
| 6,516,009 B1 | 2/2003 | Tanaka | |
| 6,576,919 B1 | 6/2003 | Yoshida | |
| 6,583,381 B1 | 6/2003 | Duignan | |
| 6,590,698 B1 | 7/2003 | Ohtsuki et al. | |
| 6,660,085 B2 | 12/2003 | Hara et al. | |
| 6,841,797 B2 | 1/2005 | Isobe et al. | |
| 6,861,614 B1 * | 3/2005 | Tanabe et al. | 219/121.66 |
| 7,105,048 B2 * | 9/2006 | Yamazaki et al. | 117/3 |
| 2001/0038127 A1 | 11/2001 | Yamazaki et al. | |
| 2001/0055830 A1 | 12/2001 | Yoshimoto | |
| 2002/0000426 A1 * | 1/2002 | Mead et al. | 219/121.7 |
| 2002/0031876 A1 | 3/2002 | Hara et al. | |
| 2002/0047580 A1 | 4/2002 | Kunii et al. | |
| 2002/0054231 A1 | 5/2002 | Masuyuki | |
| 2002/0094008 A1 | 7/2002 | Tanaka | |
| 2002/0145711 A1 | 10/2002 | Magome et al. | |
| 2002/0146873 A1 | 10/2002 | Tanaka | |
| 2003/0024905 A1 | 2/2003 | Tanaka | |
| 2003/0153182 A1 | 8/2003 | Yamazaki et al. | |
| 2003/0211714 A1 | 11/2003 | Yamazaki et al. | |
| 2003/0228723 A1 | 12/2003 | Yamazaki et al. | |
| 2004/0040938 A1 | 3/2004 | Yamazaki et al. | |

FOREIGN PATENT DOCUMENTS

| | | |
|---|---|---|
| JP | 02-181419 | 7/1990 |
| JP | 04-282869 | 10/1992 |
| JP | 05-315278 | 11/1993 |
| JP | 07-130652 | 5/1995 |
| JP | 08-078329 | 3/1996 |
| JP | 09-253879 | 9/1997 |
| JP | 09-270393 | 10/1997 |
| JP | 10-135468 | 5/1998 |
| JP | 10-135469 | 5/1998 |
| JP | 11-354463 | 12/1999 |

OTHER PUBLICATIONS

Robert S. Sposili et al., "Sequential Lateral Solidification of Thin Silicon Films on $SiO_2$", Applied Physics Letters, vol. 69, No. 19, Nov. 4, 1996, pp. 2864-2866.

* cited by examiner

FIG.2A
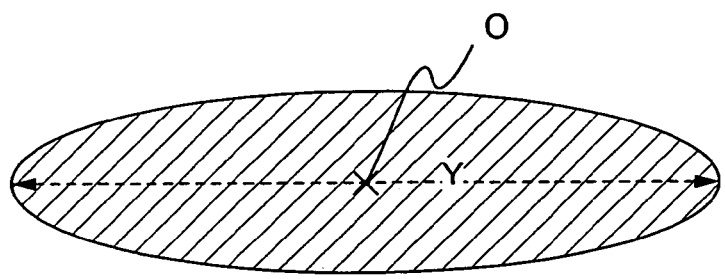
FIG.2B
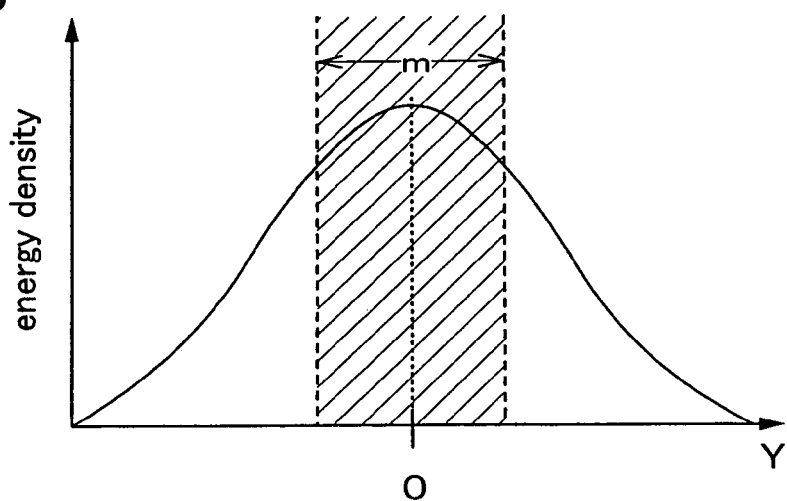
FIG.2C
FIG.2D
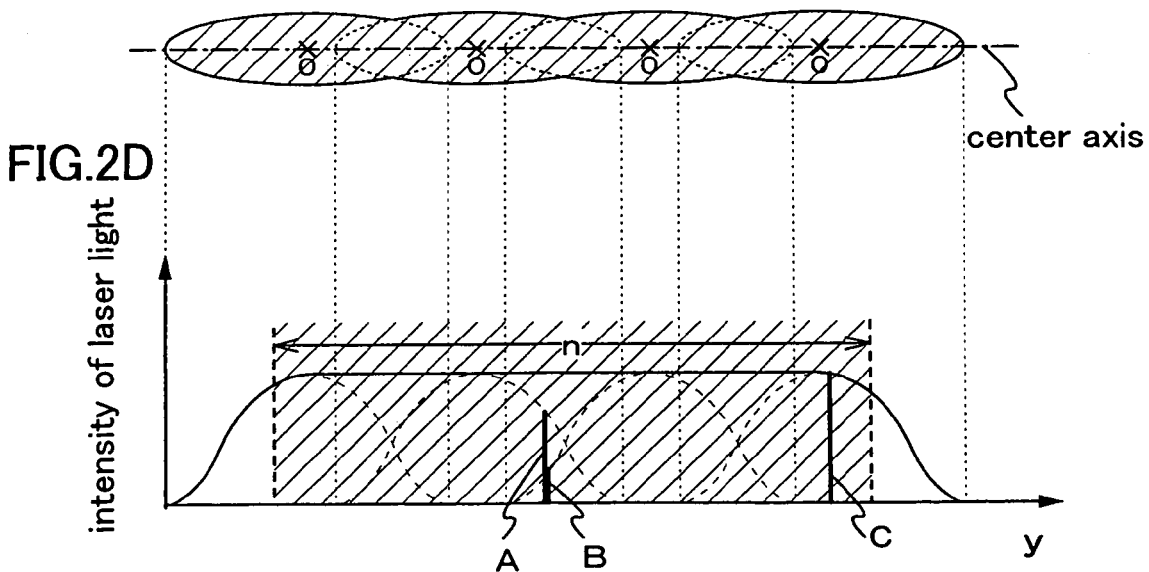

center axis direction center axis direction

901

902

LASER IRRADIATION METHOD AND APPARATUS

BACKGROUND OF THE INVENTION

1. Field of the Invention

The present invention relates to a laser irradiation apparatus and a laser irradiation method for crystallizing a semiconductor film using a laser light or for performing activation after ion implantation.

2. Description of the Related Art

In recent years, a technique of forming a TFT on a substrate has greatly progressed, and its application and development for active matrix semiconductor display devices have been advanced. In particular, since a TFT using a polycrystalline semiconductor film has higher field-effect mobility (also referred to as mobility) compared to a TFT using a conventional amorphous semiconductor film, it enables high-speed operation. Although the pixel is conventionally controlled by a driving circuit provided outside the substrate, it is therefore possible to control the pixel by the driving circuit formed on the same substrate where the pixel is formed.

Incidentally, as for the substrate used in the semiconductor device, a glass substrate is regarded as promising in comparison with a single crystal silicon substrate in terms of the cost. A glass substrate is inferior in heat resistance and is easily subjected to thermal deformation Therefore, in the case where a polysilicon TFT is formed on the glass substrate, in order to avoid thermal deformation of the glass substrate, the use of laser annealing for crystallization of the semiconductor film is extremely effective.

Characteristics of laser annealing are as follows: it can greatly reduce a processing time in comparison with an annealing method using radiation heating or conductive heating; and it hardly causes thermal damage to the substrate by selectively and locally heating a semiconductor or the semiconductor film, for example.

Note that the laser annealing method here indicates a technique of re-crystallizing the damaged layer formed on the semiconductor substrate or the semiconductor film, and a technique of crystallizing the semiconductor film formed on the substrate. Also, the laser annealing method here includes a technique applied to leveling or surface reforming of the semiconductor substrate or the semiconductor film. A laser oscillating apparatus applied thereto is a gas laser oscillating apparatus represented by an excimer laser, or a solid laser oscillating apparatus represented by a YAG laser. It is known that the apparatus performs crystallization by heating a surface layer of the semiconductor by irradiation of the laser light in an extremely short period of time of about several tens of nanoseconds to several tens of microseconds.

Lasers are roughly divided into two types: pulse oscillation and continuous wave, according to an oscillation method. In the pulse oscillating laser, an output energy is relatively high, so that mass productivity can be increased by setting the size of a beam spot to several $cm^2$ or more. In particular, when the shape of the beam spot is processed using an optical system and made to be a linear shape of 10 cm or more in length, it is possible to efficiently perform irradiation of the laser light to the substrate and further enhance the mass productivity. Thus, for crystallization of the semiconductor film, the use of a pulse oscillating laser is becoming mainstream.

However, in recent years, in crystallization of the semiconductor film, it is found that grain size of the crystal formed in the semiconductor film is larger in the case where the continuous wave laser is used than the case where the pulse oscillating laser is used. When the crystal grain size in the semiconductor film becomes large, the mobility of the TFT formed using the semiconductor film becomes high. For this reason, a continuous wave laser has been attracting attention recently.

However, since the maximum output energy of the continuous wave laser is generally small in comparison with that of the pulse oscillating laser, desired power that is necessary for crystallization of the semiconductor film can be obtained by decreasing the size of the beam spot as about $10^{-3}$ $mm^2$. However, the small beam spot needs long scanning times of laser beam per one substrate, thereby the substrate processing is ineffective.

If the beam spot is enlarged so as to improve the substrate processing efficiency, of course, energy density is decreased. In order to give the semiconductor film the total amount of heat necessary for crystallization, it is necessary to prolong the irradiation time. Consequently, the semiconductor film absorbs the laser light and conducts the heat to the substrate that cause thermal deformation of the substrate and TFT characteristics deteriorations due to diffusion of impurities from the glass substrate to the semiconductor film. In addition, when the substrate is heated, the crystallinity of the semiconductor film is hard to be even due to the heat of the substrate and the stability of TFT characteristics is disrupted.

In view of the foregoing, an object of the present invention is providing a laser crystallization method, and a laser irradiation apparatus using the a laser crystallization method, through which a substrate processing efficiency can be improved and damages to the substrate due to heat can be suppressed.

SUMMARY OF THE INVENTION

A laser irradiation apparatus according to the present invention includes: a plurality of first means (laser oscillating apparatuses) for oscillating laser lights; a second means (optical system) for condensing the laser lights oscillated from the plurality of laser oscillating apparatuses and making the laser lights on an object to be processed partially overlap each other to thereby synthesize the laser lights; a slit with which a part of the synthesized laser light can be shielded; and a third means for controlling a position of the laser light irradiated through the slit on the object to be processed. Further, the laser irradiation apparatus of the present invention may further include a fourth means for controlling oscillation by each of the plurality of first means and controlling the position of the laser light controlled in shape by the slit on the object to be processed through synchronization of the plurality of laser oscillating apparatuses and the third means.

By synthesizing the laser lights oscillated from the plurality of laser oscillating apparatuses, low energy density portions can complement each other in the laser lights. Thus, as compared with the case of using the laser lights emitted from the plurality of laser oscillating apparatuses independently without synthesizing the lights, an area of laser light having the energy density high enough for crystallization is expanded. As a result, a substrate processing efficiency can be enhanced.

Further, the present invention adopts a slit for partially cutting an area having the energy density below a predetermined level in the synthesized laser light in a scanning direction. With the above construction, an average value of energy densities of the laser light in the scanning direction can be increased and the laser light irradiation time per area is reduced. Further, despite this reduction, a heat quantity can be increased in total, which is applied to the object to be processed. Accordingly, a crystallinity of a semiconductor film can be enhanced while preventing a substrate from being excessively heated.

Also, after forming the semiconductor film, the laser light irradiation may be performed for crystallizing the semiconductor film so as not to expose the film to the air (for instance, the laser light irradiation is performed under a specified gas atmosphere such as a rare gas atmosphere, a nitrogen atmosphere, or an oxygen atmosphere or under a reduced pressure atmosphere). With this construction, it is possible to prevent a contaminant (boron contained in a filter used to enhance cleanliness of the air, for instance) at a molecular level within a clean room from mixing into the semiconductor film during the crystallization using the laser lights.

BRIEF DESCRIPTION OF THE DRAWINGS

In the accompanying drawings:

FIGS. 2A to 2D show a shape of a laser light and an energy density distribution thereof;

DETAILED DESCRIPTION OF THE PREFERRED EMBODIMENTS

Figure 1:
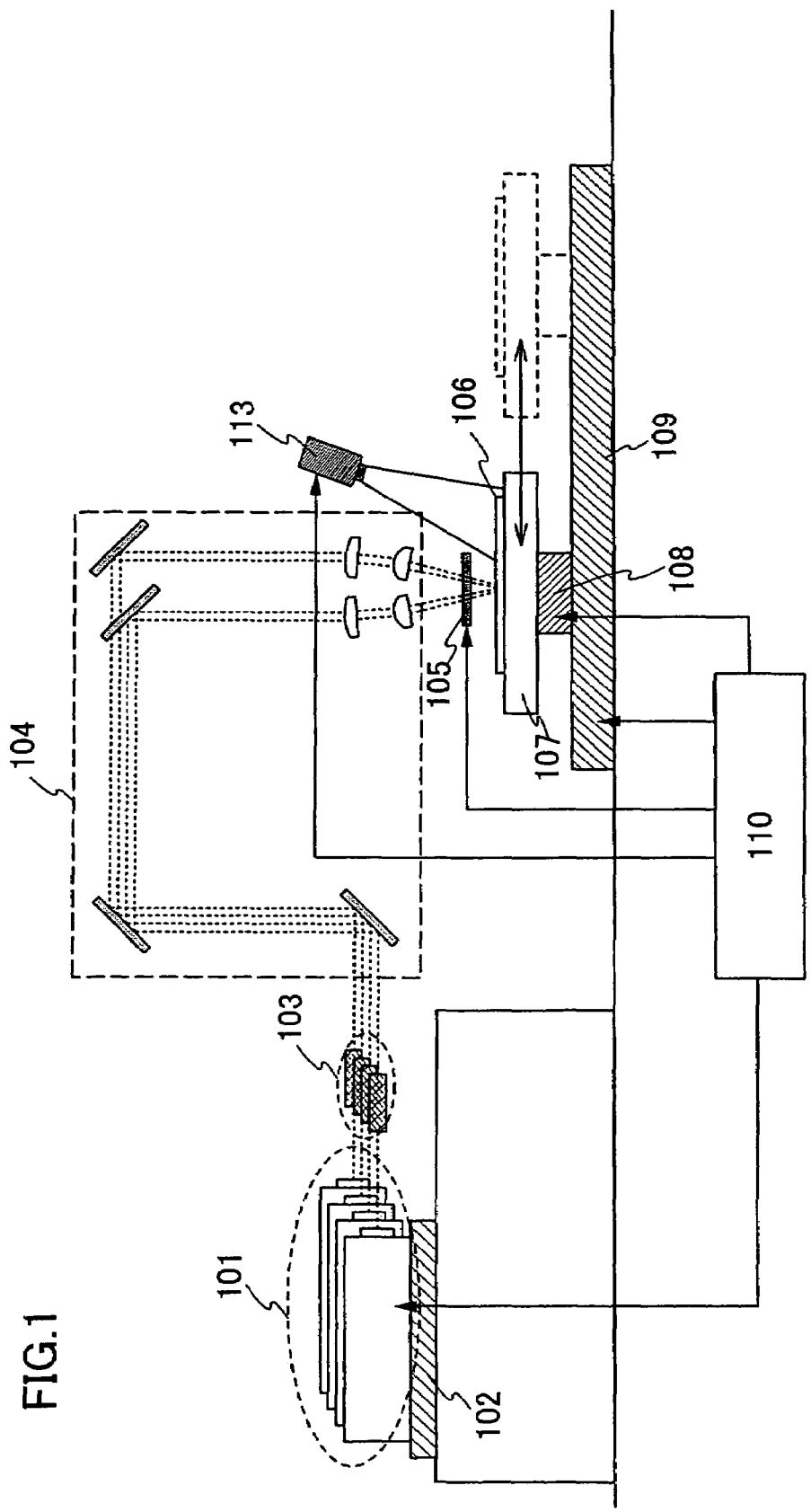
FIG. 1 shows a construction of a laser irradiation apparatus of the present invention.

Hereinafter, a construction of a laser irradiation apparatus of the present invention will be described with reference to FIG. 1. In the figure, reference numeral 101 denotes laser oscillating apparatuses. Although the four laser oscillating apparatuses are used in FIG. 1, the plural laser oscillating apparatuses of the laser irradiation apparatus of the present invention may suffice therefor, and the number of apparatuses is not limited to this.

It is possible to change lasers as appropriate depending on the purpose of processing. In the present invention, any known laser can be used. Also, the laser is not limited to a continuous wave laser but may be a pulse oscillating laser. Further, a gas laser or solid-state laser may be adopted. Given as the gas laser are an excimer laser, an Ar laser, a Kr laser, and the like. Examples of the solid-state laser include a YAG laser, a $YVO_4$ laser, a YLF laser, a $YAlO_3$ laser, a glass laser, a ruby laser, an alexandrite laser, a Ti: sapphire laser, and a $Y_2O_3$ laser. As the solid-state laser, there is applied a laser using crystal such as YAG, $YVO_4$, YLF, or $YAlO_3$ doped with Cr, Nd, Er, Ho, Ce, Co, Ti, Yb, or Tm. A fundamental wave of the laser varies depending on a material to be doped and a laser light having the fundamental wave of around 1 ìm is obtained. Also, harmonics with respect to the fundamental wave can be obtained using a nonlinear optical element.

Furthermore, it is possible to use an ultraviolet laser light obtained by converting an infrared laser light emitted from a solid-state laser into a green laser light using a nonlinear optical element and then, further processing the green laser light using another nonlinear optical element.

Note that the laser oscillating apparatuses 101 may be constructed so as to keep a temperature thereof constant using a chiller 102. It is not necessarily required to use the chiller 102. By keeping the temperature of the laser oscillating apparatuses 101 constant, however, variations in energy of laser lights to be outputted, which are caused depending on the temperature, can be suppressed.

Also, reference numeral 104 denotes an optical system that is capable of condensing the laser lights by changing optical paths of the lights outputted from the laser oscillating apparatuses 101 and processing shapes of the laser lights. Further, an important point concerning the optical system 104 of the present invention resides in an operation capable of synthesizing the laser lights outputted from the plural laser oscillating apparatuses 101 while causing the lights to partially overlap each other.

Note that AO modulators 103 that can change traveling directions of the laser lights may be provided on the optical path between a substrate 106 as an object to be processed and the laser oscillating apparatuses 101.

The synthesized laser light is applied onto the substrate 106 as the object to be processed through a slit 105. The slit 105 preferably contains a material that is capable of partially shielding the laser lights and is not deformed or damaged by the laser lights. In addition, the slit 105 may have a variable width of an opening (hereinafter, referred to as slit width), which allows the laser lights to pass therethrough. Thus, the width of the laser light in the scanning direction can be controlled in accordance with the slit width.

Further, when the laser lights oscillated from the laser oscillating apparatuses 101 do not pass through the slit 105, the shape of the laser light on the substrate 106 varies depending on the kind of laser, and the laser lights may also be shaped with the optical system.

The substrate 106 is placed on a stage 107. In FIG. 1, position controlling means 108 and 109 correspond to means for controlling the position of the laser light on the object to be processed, and the position of the stage 107 is controlled by the position controlling means 108 and 109. Note that in FIG. 1, it is possible to move (scan) the laser lights and to change the scanning direction of the laser lights by changing the position of the substrate using the position controlling means 108 and 109. The position controlling means 108 controls the position of the stage 107 in an X direction, while the position controlling means 109 controls the position of the stage 107 in a Y direction.

Also, the laser irradiation apparatus of the present invention may include a computer 110 provided with both functions of a central processing unit and storage means such as a memory. The computer 110 can control the oscillating operation of the laser oscillating apparatuses 101 and in addition, control the position controlling means 108 and 109 to thereby set the substrate at a predetermined position. The width of the slit 105 may be controlled using the computer 110.

The laser irradiation apparatus of the present invention may further include means for adjusting a temperature of the object to be processed. Also, the laser lights are high in directivity and energy density, so that a damper may be provided in order to prevent a reflection light from being applied onto an inappropriate portion. It is preferable that the damper have a property of absorbing the reflection light. Also, by circulating coolant in the damper, temperature rise at a partition wall due to the absorption of the reflection light can be avoided. Also, the stage 107 may be provided with means for heating the substrate (substrate heating means).

Also, for an alignment of the substrate 106, there may be provided one CCD camera 113. Alternatively, the plural CCD cameras may be provided as needed.

Next, a description will be given of the shape of the laser lights synthesized by causing the plural laser lights to overlap each other.

FIG. 2A shows an example of the shape of the laser lights before the synthesis. The laser light shown in FIG. 2A has an elliptic shape. Note that in the laser irradiation apparatus of the present invention, the shape of the laser light is not limited to the elliptic shape. The shapes of the laser lights vary depending on the kind of laser and it is also possible to shape the laser light with the optical system. For instance, the laser light emitted from the XeCl excimer laser (wavelength: 308 nm and pulse width: 30 ns) L3308 manufactured by Lambda K.K. has a rectangular shape having a size of 10 mm×30 mm (both correspond to half width in a beam profile). Also, the laser light emitted from the YAG laser has a circular shape if a rod takes a cylindrical shape, and has a rectangular shape if the rod takes a slab shape. Also, by further shaping such a laser light with the optical system, it is also possible to generate a laser light having a desired size.

FIG. 2B shows the energy density distribution of the laser light in a major axis Y direction of the laser light shown in FIG. 2A. As to the distribution of the energy density of the laser light having the elliptic shape, the energy density is increased with reduction of a distance to a center "O" of the ellipse.

Next, FIG. 2C shows the shape of the laser light obtained by synthesizing laser lights. Here, FIG. 2C shows a case where one laser light is obtained by causing the four laser lights to overlap each other. However, the number of laser lights that are made to overlap each other is not limited to this.

As shown in FIG. 2C, the respective laser lights are synthesized by arranging the major axes of the respective ellipses on the same line and causing the laser lights to partially overlap each other. In this manner, there is obtained one laser light. Note that a straight line obtained by connecting the centers "O" of the respective ellipses will be hereinafter referred to as a "center axis".

FIG. 2D shows the energy density distribution of the laser light in the center axis direction of the synthesized laser light as shown in FIG. 2C. The energy densities are added in portions where the laser lights before the synthesis overlap each other. For instance, as illustrated in the figure, if the energy densities A and B of beams that overlap each other are added, the addition result becomes approximately equal to a peak value C of the energy density of the beam and the energy densities are equalized in each portion between the centers "O" of the respective ellipses.

Here, it is ideal that a result obtained by adding A to B becomes equal to the value of C, but the actual addition result does not necessarily equal the value of C. The difference between the value obtained by adding A to B and the value of C preferably falls within a range of ±10% of the value of C, more preferably, within a range of ±5% or less. However, it is possible for a designer to set an allowable range as appropriate.

As can be seen from FIG. 2D, by having the plural laser lights overlap each other to thereby cause the low energy density portions to complement each other in the laser lights, it becomes possible to enhance the crystallinity of the semiconductor film with efficiency in comparison with a case where the plural laser lights are not made to overlap each other and are used independently of each other. For instance, it is assumed that the energy density necessary for obtaining the desired crystal is achieved only in a shaded area in FIG. 2B, and the energy densities in other areas are lower than the desired value. In this case, the desired crystal is obtained with each laser light only in the shaded area whose width in the center axis direction is indicated by "m". However, as shown in FIG. 2D, by having the laser lights overlap each other, it becomes possible to obtain the desired crystal in an area whose width in the center axis direction is denoted by n (n>4 m). As a result, the semiconductor film can be crystallized with more efficiency.

Figure 3A:
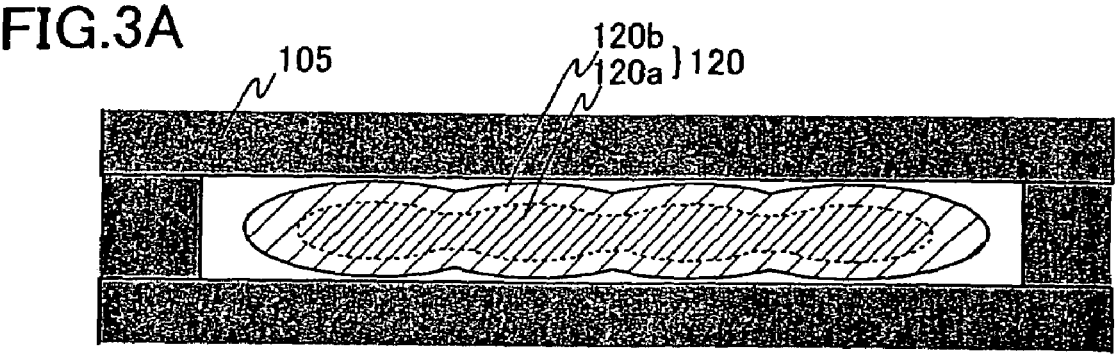
FIGS. 3A to 3C show a positional relation between a laser light and a slit.
Figure 3B:
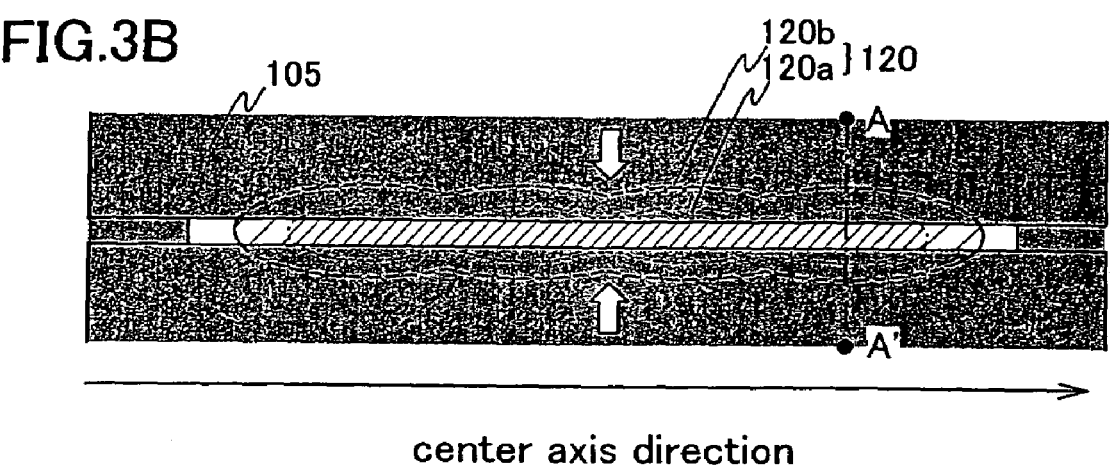
Figure 3C:
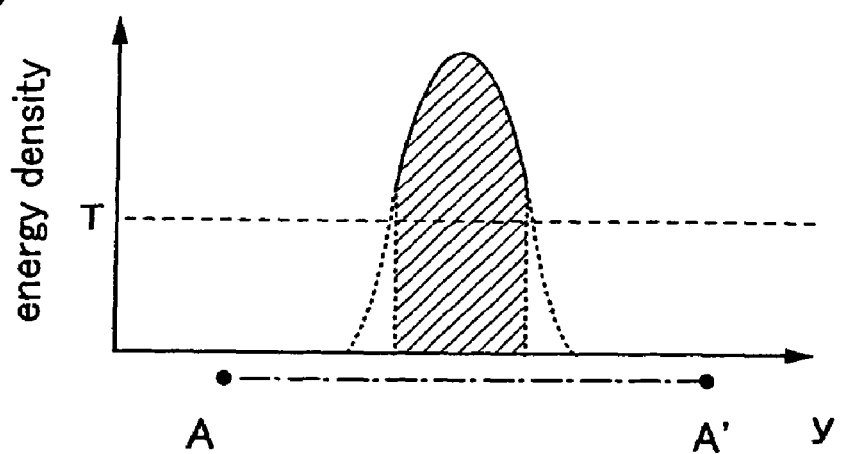

Further, in the present invention, the slit 105 is used to shield the area exhibiting the energy density lower than the desired value in the direction vertical to the center axis of the laser light. Referring to FIGS. 3A to 3C, the positional relation between the synthesized laser light and the slit will be explained.

The slit 105 used in the present invention may have the variable slit width and the width may be controlled by the computer 110. In FIG. 3A, denoted by 120 is a laser light obtained through the synthesis in FIG. 2C together with its shape. Also, in the laser light 120, an area having the energy density that reaches the predetermined value is denoted by 120a, whereas an area having the energy density below the predetermined value is denoted by 120b. Reference numeral 105 denotes the slit. In FIG. 3A, a state in which the laser light 120 is not shielded by the slit is shown.

FIG. 3B shows how the laser light is partially shielded by the slit 105. As shown in FIG. 3B, in the present invention, the areas 120b sandwiching the area 120a are shielded by the slit 105 in the direction vertical to the center axis of the laser light 120. FIG. 3C shows the energy density distribution as viewed along the line A-A' vertical to the center axis of the laser light of FIG. 3B. As apparent from the figure, at least the areas having the energy density lower than the predetermined level (e.g., T) are shielded by the slit 105.

With the above construction, the average value of energy densities of the laser lights can be increased in the direction vertical to the center axis thereof. As a result, the laser light irradiation time at any point on the object to be processed can be suppressed. Accordingly, the crystallinity of the semiconductor film can be enhanced while preventing the substrate from being excessively heated.

Figure 4A:
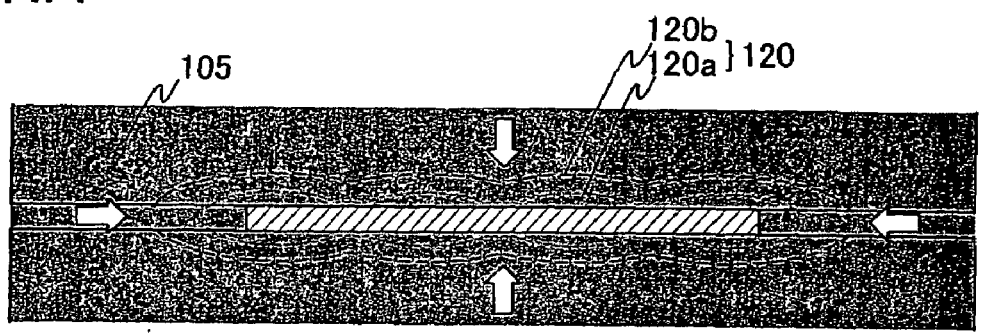
FIGS. 4A and 4B show a positional relation between a laser light and a slit.
Figure 4B:
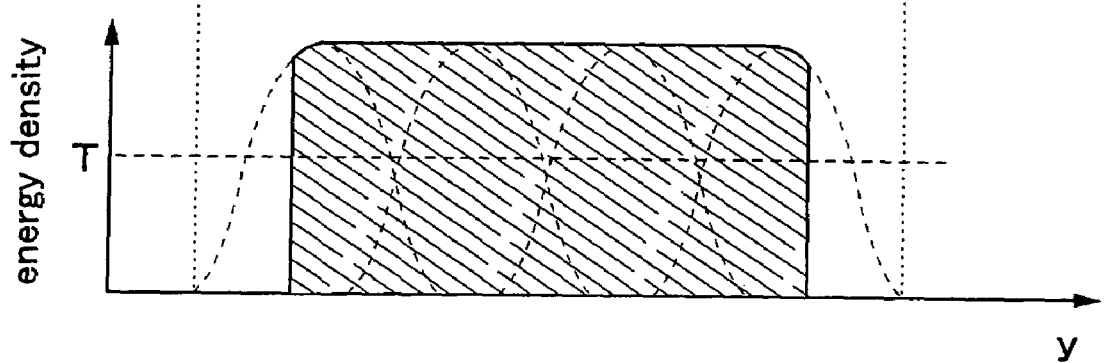

Furthermore, in the present invention, the areas 120b sandwiching the area 120a may be shielded by the slit 105 in the center axis direction of the laser light as well. FIG. 4A shows how the areas 120b sandwiching the area 120a are shielded by the slit 105 in the center axis direction of the laser light. Further, FIG. 4B shows the energy density distribution in the center axis direction of the laser light shown in FIG. 4A. As apparent from FIG. 4B, at least the areas having the energy density lower than the predetermined level (e.g., T) are shielded by the slit 105.

The semiconductor film crystallized by the area of the laser light with the low energy density exhibits poor crystallinity. To be specific, as compared with the areas that satisfy the predetermined energy density, the grain size is small or the crystal growth proceeds in different directions in some cases. Accordingly, it is needed to adjust layout of a scanning path of the laser light and an active layer so as to prevent the area having the low energy density from overlapping the active layer formed later. By using the laser light exhibiting the energy density distribution of FIG. 4B, the areas having the low energy density can be eliminated or narrowed, so that the limitations imposed on the layout of the scanning path of the laser light and the active layer can be eased.

Also, the shape of the laser light can be changed while keeping the energy density constant without terminating the output from the laser oscillating apparatuses, which makes it possible to avoid a situation where edges of the laser lights overlap the active layer or channel formation region of the active layer. Also, there can be prevented a situation where unnecessary portions are irradiated with the laser lights to damage the substrate.

Figure 5A:
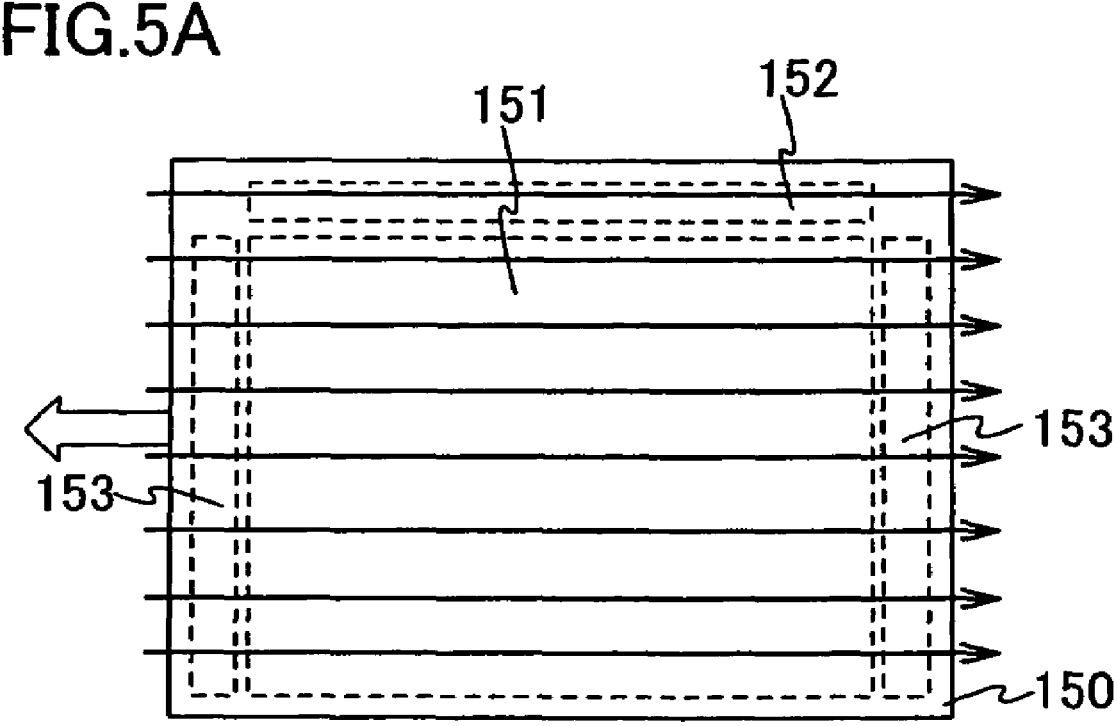
FIGS. 5A and 5B show a direction in which a laser light moves on an object to be processed.

Next, referring to FIG. 5A, the scanning direction of the laser lights on a semiconductor film 150 formed to manufacture an active matrix semiconductor device will be described. In FIG. 5A, regions 151, 152, and 153 each surrounded by the broken line correspond to portions where a pixel portion, a signal line driving circuit, and a scanning line driving circuit are formed, respectively.

Figure 5B:
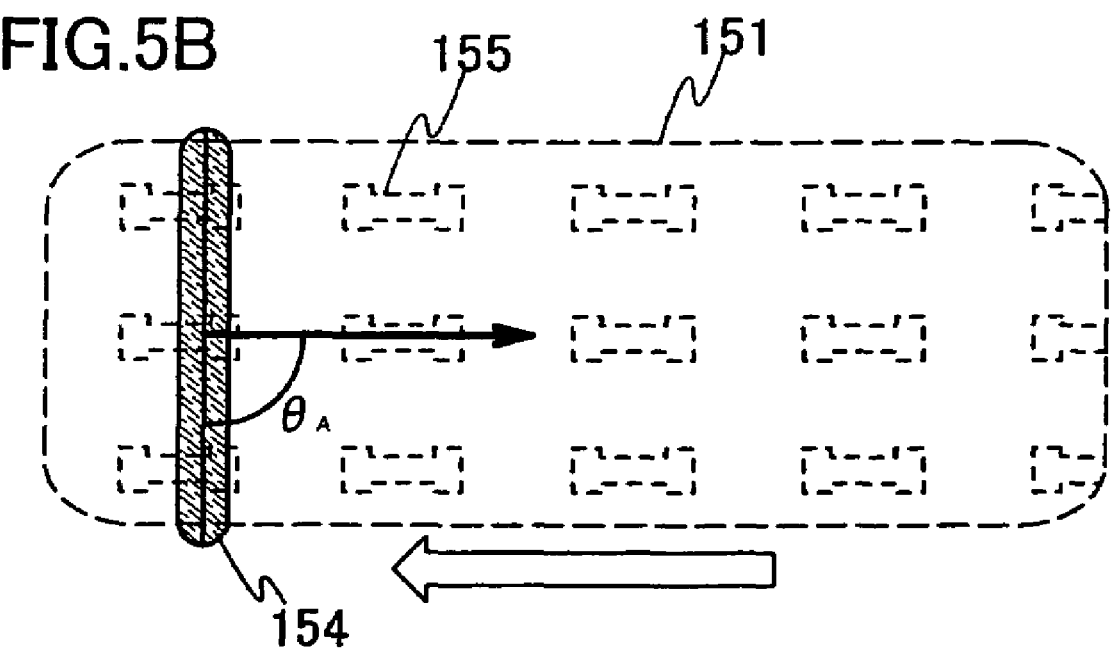

As shown in FIG. 5A, the substrate moves in a direction indicated by the outlined arrow. The solid-line arrows specify a relative scanning direction of the laser lights. FIG. 5B is an enlarged view of a laser light 154 in the region 151 in which the pixel portion is to be formed. Active layers 155 are formed in the regions irradiated with the laser lights.

Further, in the case explained using FIGS. 5A and 5B, the central axis direction of the laser light is kept vertical to the scanning direction. However, it is not always necessary to set the central axis direction of the laser light vertical to the scanning direction. For example, an acute angle $\theta_A$ between the central axis direction of the laser light and the scanning direction may be set to 45°±35°, desirably 45°. The highest substrate processing efficiency is obtained when the central axis of the laser light is vertical to the scanning direction. On the other hand, when performing scanning in such a manner that the central axis of the synthesized laser light and the scanning direction form an angle of 45°±35° therebetween, desirably an angle closer to 45°, the number of crystal grains present in the active layer can be intentionally increased as compared with the case where the central axis of the laser light is vertical to the scanning direction upon scanning. Accordingly, variations of the characteristics due to crystal orientation and crystal grains can be reduced.

Further, in the present invention, in the computer 110 of FIG. 1, the portion scanned with the laser light may be defined according to the pattern information of the mask. In this case, the computer 110 controls the position controlling means 108 and 109 so as to irradiate the determined portion to be scanned with the laser light, thereby partially crystallizing the semiconductor film. Thus, the laser light can be scanned so as to crystallize at least the indispensable portion thereof. It is unnecessary to irradiate the entire substrate with the laser light, so that the processing efficiency of the substrate can be enhanced.

Further, in the case where the crystallized semiconductor film is used as the active layers of TFTs, it is preferable that the scanning direction of the laser lights be set parallel to the direction in which carriers in the channel formation region move.

Figure 6:
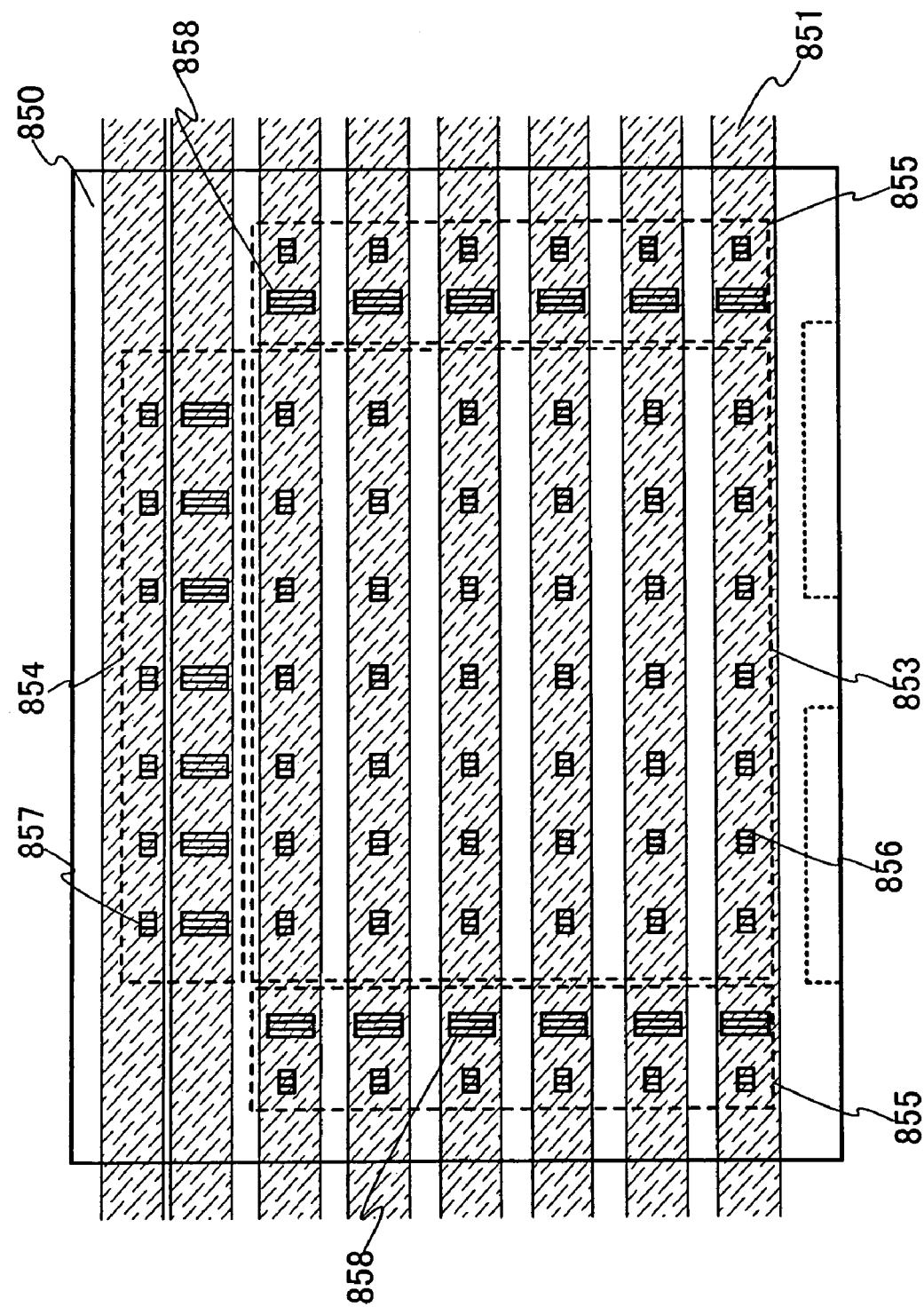
FIG. 6 shows a direction in which a laser light moves on an object to be processed.

Referring to FIG. 6, a description will be made of an example of a relation between the scanning direction of the laser light to be applied to the semiconductor film formed for manufacturing the active matrix semiconductor device and the layout of the active layers in the respective circuits.

In FIG. 6, a semiconductor film 850 is formed on the substrate. A portion surrounded by a broken line 853 corresponds to a portion where the pixel portion is formed. Plural portions 856 each serving as the active layer are formed in the pixel portion. A portion surrounded by a broken line 854 corresponds to a portion where the signal line driving circuit is formed. Plural portions 857 each serving as the active layer are formed in the signal line driving circuit. A portion surrounded by a broken line 855 corresponds to a portion where the scanning line driving circuit is formed. Plural portions 858 each serving as the active layer are formed in the scanning line driving circuit.

Further, in actuality, the portions 856, 857, and 858 serving as the active layers of each circuit have a size of several tens of μm in unit, which is smaller than that shown in FIG. 6. Note that, in the figure, the portions are intentionally shown in an enlarged fashion for the easy-to-understand illustration. The portions 856, 857, and 858 serving as the active layers of each circuit are laid out such that the carriers in the channel formation regions move in the same direction.

A portion 851 to be crystallized through the laser light irradiation covers all of the portions 856, 857, and 858 each serving as the active layer. Also, the scanning direction of the laser light is aligned with the direction in which the carriers move in the cannel formation region.

EMBODIMENTS

Hereinafter, embodiments of the present invention will be described.

Embodiment 1

The crystalline semiconductor film formed by irradiation of laser light includes aggregations of a plurality of crystal grains. The crystal grains have random positions and sizes and hence, it is difficult to form a crystalline semiconductor film with specified positions and sizes of crystal grains. Accordingly, the active layers formed by patterning the crystalline semiconductor film into the islands may contain crystal gain interfaces (grain boundaries).

Unlike crystal grains, the grain boundaries contain therein an infinite number of recombination centers and trapping centers associated with amorphous structure and crystal defects. It is known that carriers trapped in the trapping centers increase the potential of the grain boundaries, which form barriers against carriers, so that the carriers are reduced in current transportability. Therefore, the grain boundaries present in the active layer of a TFT, or particularly in the channel forming region, will exert serious effects on the TFT characteristics, such as a significant decrease in the mobility of the TFT, or an increased OFF current due to current flow through the grain boundaries. Furthermore, a plurality of TFTs, fabricated based on the premise that the same characteristics can be obtained, will encounter varied characteristics due to the presence of the grain boundaries in the active layers.

The reason why the laser irradiation on the semiconductor film produces crystal grains of random sizes at random positions is as follows. In the liquid semiconductor film melted by laser irradiation, interface between solid and liquid within the film move from comparative low temperature region to high temperature region over time, that causes crystallization of the semiconductor film. When laser beam is irradiated on whole surface of the semiconductor film, the temperature of the semiconductor film in a horizontal direction (hereinafter referred to as "lateral direction") with respect to the surface thereof is comparatively constant, however the temperature is high as approaching the surface in a film thickness direction, that is, the temperature gradient can be seen. Crystal grows by moving interface between solid and liquid from crystal nucleus in the region, which is far from the semiconductor film surface and has comparative low temperature, to the semiconductor film surface. Since the crystal nuclei occur at random positions in the lateral direction, the crystal grains grow to collide with one another, where the crystal-growth process terminates. Consequently, the crystal grains have random positions and sizes.

On the other hand, there has been proposed a method wherein the crystalline semiconductor film is formed by locally melting the semiconductor film to form the temperature gradient in the lateral direction instead of melting the whole semiconductor film to form the temperature gradient in the thickness direction. In this case, the moving direction of interface between solid and liquid in the semiconductor film can be controlled not in the thickness direction but in the lateral direction. Consequently the crystal growth direction can be set in the lateral direction having temperature gradient, hence crystal grains grow to have a length that is several ten times of the thickness. Hereinafter, this phenomenon will be referred to as "superlateral growth".

The superlateral growth process provides relatively larger crystal gains, correspondingly reducing the number of grain boundaries. Unfortunately, laser light for effecting the superlateral growth is quite limited in the range of energy. In addition, it is difficult to control the location where large crystal grains are formed. Furthermore, other regions than the large crystal grains are micro crystal regions containing an infinite number of nuclei or amorphous regions and hence, irregular crystal sizes result.

It is contemplated that a location- and direction-controlled crystal grain growth process is practicable if laser light in such an energy range as to completely melt the semiconductor film is used and a lateral temperature gradient can be controlled. A variety of attempts have been made to realize this process.

For instance, James. S. Im et al at Colombia University have proposed Sequential Lateral Solidification method (hereinafter referred to as SLS method) for effecting the superlateral growth at arbitrary locations. The SLS method is arranged such that crystallization is performed by translating a slit mask by a distance of superlateral growth (about 0.75 μm) at each shot of the laser light.

This embodiment illustrates an example where the SLS method is applied to the invention.

Firstly, a first shot of the laser light is irradiated on a semiconductor film 802. The first shot of the laser light is emitted from the pulse oscillating type laser and is irradiated at such an energy density as to melt a local portion of the area to the full depth of the semiconductor film.

Figure 7A:
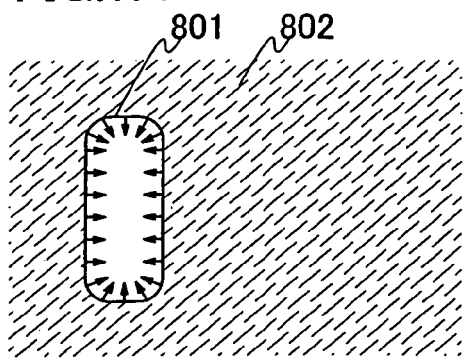
FIGS. 7A to 7E are explanatory views showing a mechanism of crystallization using an SLS method.

FIG. 7A schematically shows a state of the semiconductor film immediately after a first shot of the laser light. The irradiation of the laser light locally melts the semiconductor film 802 to the full depth thereof at the portion thereof under a beam spot 801.

At this time, the semiconductor film 802 is fully molten at its portion under the beam spot 801 whereas a portion out of the beam spot is not molten or molten at much lower temperature than the beam spot portion. Therefore, an edge of the beam spot portion forms crystal nuclei which grow laterally from the edge of the beam spot portion toward center as indicated by arrows in the figure.

As the crystal growth proceeds with time, the crystal grains collide with crystal grains from crystal nuclei produced in the fully molten portion or with the growing crystal nuclei on the opposite side so that the crystal growth stops at a central portion 803 of the beam spot. FIG. 7B schematically shows a state of the semiconductor film at the termination of the crystal growth. The semiconductor film has an irregular surface at the central portion 803 of the beam spot, where a greater number of micro crystals are present than in the other portion or the crystal grains collide with one another.

Next, a second shot of the laser light is applied. The second shot is applied to place slightly shifted from the beam spot of the first shot. FIG. 7C schematically shows a state of the semiconductor film immediately after the second shot. In FIG. 7C, a beam spot of the second shot is shifted from the portion 801 under the beam spot of the first shot to a degree that the beam spot of the second shot covers the central portion 803 formed by the first shot.

At this time, a portion under a beam spot 804 of the second shot is fully molten whereas a portion out of the beam spot is not molten or molten at much lower temperature than the beam spot portion. Therefore, an edge of the beam spot portion forms crystal nuclei, which grow laterally from the edge of the beam spot portion toward center as indicated by arrows in the figure. At this time, in the portion 801 crystallized by the first shot, a part unirradiated by the beam spot of the second shot forms crystal nuclei so that the laterally grown crystal nuclei due to the first shot further grow along the scanning direction.

As the crystal growth proceeds with time, the crystal grains collide with crystal grains from crystal nuclei produced in the fully molten portion or with the growing crystal grains on the opposite side so that the crystal growth stops at a central portion 805 of the beam spot of the second shot. FIG. 7D schematically shows a state of the semiconductor film at the termination of the crystal growth. The semiconductor film has an irregular surface at the central portion 805 of the beam spot, where a greater number of micro crystals are present than in the other portion or the crystal grains collide with one another.

Figure 7E:
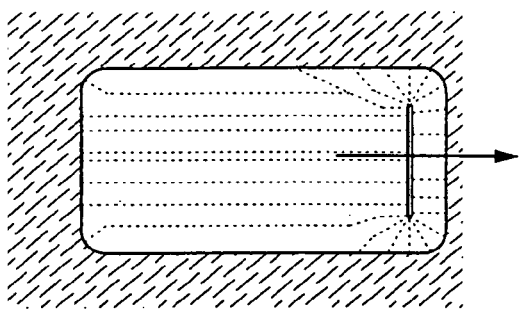
Figure 7B:
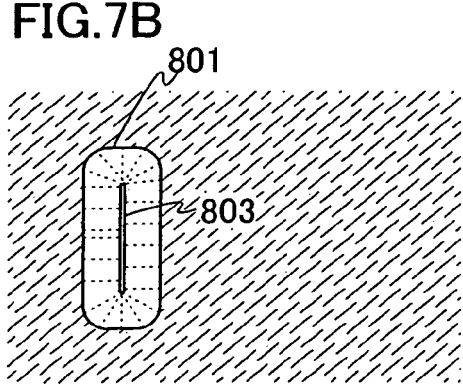
Figure 7C:
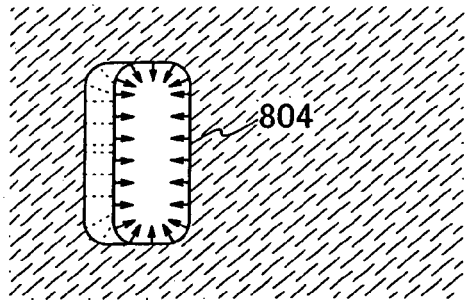
Figure 7D:
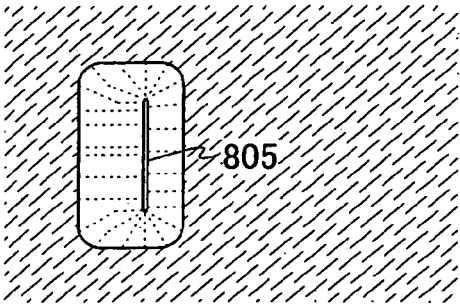

In a similar manner, a third shot and the subsequent shots are applied as slightly shifting beam spots thereby accomplishing the crystal growth extending in parallel with the scanning direction, as shown in FIG. 7E.

According to the above arrangement, the local crystallization can be accomplished while controlling the locations and sizes of the crystal grains.

Next, description is made on another embodiment than that of FIGS. 7A to 7E, which applies the SLS method to the invention.

Firstly, a first laser light is irradiated on a semiconductor film 812. The first laser light is irradiated exclusively on an area defined by a mask. The first laser light is emitted from the pulse oscillating type laser and irradiated at such an energy density as to melt a local portion of the area defined by the mask to the full depth of the semiconductor film.

Figure 8A:
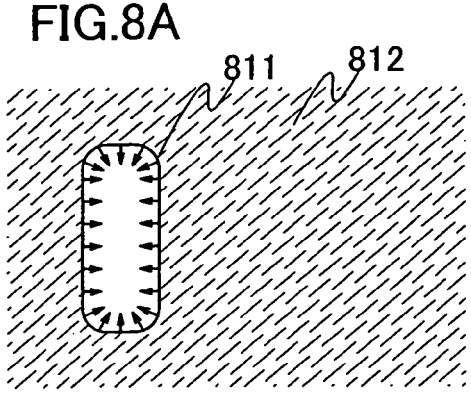
FIGS. 8A to 8E are explanatory views showing a mechanism of crystallization using an SLS method.

FIG. 8A schematically shows a state of the semiconductor film immediately after the first shot of the laser light. The irradiation of the first laser light locally melts the semiconductor film 812 to the full depth thereof at the portion thereof under a beam spot 811. An edge of the beam spot portion forms crystal nuclei, which grow laterally from the edge of the beam spot portion toward center as indicated by arrows in the figure.

Figure 8E:
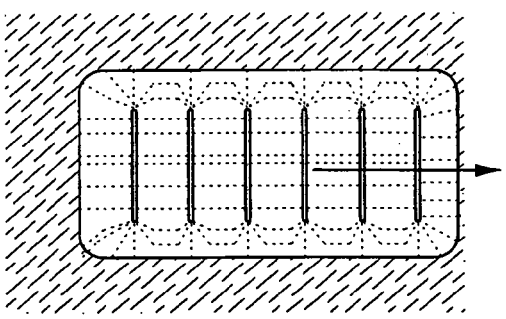
Figure 8B:
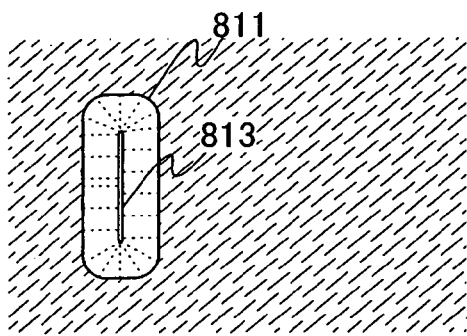

As the crystal growth proceeds with time, the crystal grains collide with crystal grains from crystal nuclei produced in the fully molten portion or with the growing crystal nuclei on the opposite side so that the crystal growth stops at a central portion 813 of the beam spot FIG. 8B schematically shows a state of the semiconductor film at the termination of the crystal growth. The semiconductor film has an irregular surface at the central portion 813 of the beam spot, where a greater number of micro crystals are present than in the other portion or the crystal grains collide with one another.

Figure 8C:
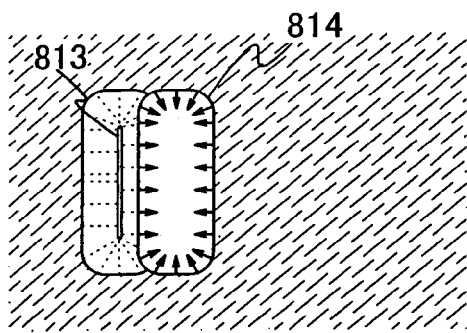

Next, a second shot of the laser light is applied. The second shot is applied to place slightly shifted from the beam spot of the first spot. FIG. 8C schematically shows a state of the semiconductor film immediately after the second shot. A beam spot of the second shot is shifted from the portion 811 under the beam spot of the first shot. In FIG. 8C, a beam spot of the second shot does not cover the central portion 813 formed by the first shot, shifted therefrom to a degree that the beam spot of the second shot overlaps a part of the beam spot of the first shot.

An edge of the portion under the beam spot of the second shot forms crystal nuclei, which grow laterally from the edge of the beam spot portion toward center as indicated by arrows in the figure. At this time, in the portion 811 crystallized by the first shot, a part unirradiated by the second shot forms crystal nuclei so that the laterally grown crystal due to the first shot further grow along the scanning direction.

Figure 8D:
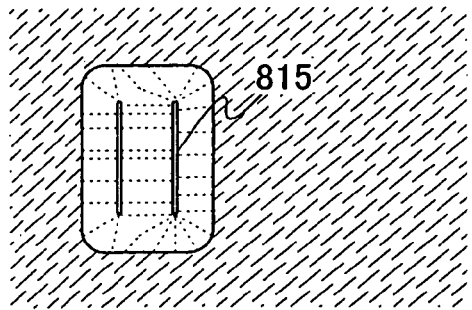

As the crystal growth proceeds with time, the crystal grains collide with crystal grains from crystal nuclei produced in the fully molten portion or with the growing crystal nuclei on the opposite side so that the crystal growth stops at a central portion 815 of the beam spot of the second shot FIG. 8D schematically shows a state of the semiconductor film at the termination of the crystal growth. The semiconductor film has an irregular surface at the central portion 815 of the beam spot, where a greater number of micro crystals are present than in the other portion or the crystal grains collide with one another.

In a similar manner, a third shot and the subsequent shots are applied as slightly shifting beam spots thereby accomplishing the crystal growth extending in parallel with the scanning direction, as shown in FIG. 8E. According to the above arrangement, the local crystallization can be accomplished while controlling the location and size of the crystal grains.

The central portions of the beam spots remain in the crystals formed by the irradiation method shown in FIG. 8. Since the center of the beam spot does not present a favorable crystallinity, it is preferred to lay out the active layers in a manner to preclude the beam spot centers from the channel forming regions or more preferably from the active layers.

In the both laser irradiation methods shown in FIGS. 7 and 8, the channel forming regions contain a reduced number of grain boundaries if the active layers are laid out in a manner that the crystal grains grow in parallel with the direction of carrier movement in the channel forming regions. This leads to an increased carrier mobility and a decreased OFF current. If, on the other hand, the active layers are laid out in a manner that the crystal grains grow in an angled direction relative to the direction of carrier movement in the channel forming regions rather than in parallel therewith, the channel forming regions contain an increased number of grain boundaries. According to a comparison among plural active layers, however, the individual active layers have a smaller difference percentage of the total grain boundaries in the channel forming region, leading to decreased variations of the mobility and OFF current of the resultant TFTs.

Usable lasers include, but not limited to, pulse oscillating type excimer lasers, YLF lasers and the like.

In the SLS method, the irradiation of the laser light should melt the semiconductor film locally to the full depth thereof at the portion thereof under a beam spot. Since the laser irradiation apparatus or the laser irradiation method can increase the average value of the laser beam energy density in the scanning direction, when performing crystallization by the SLS method, the semiconductor film can be melted locally to the full depth thereof at the portion thereof with suppressing heating the substrate by reducing the laser irradiation time per unit area.

Embodiment 2

An optical system for overlapping beam spot will be described in this embodiment.

Figure 9A:
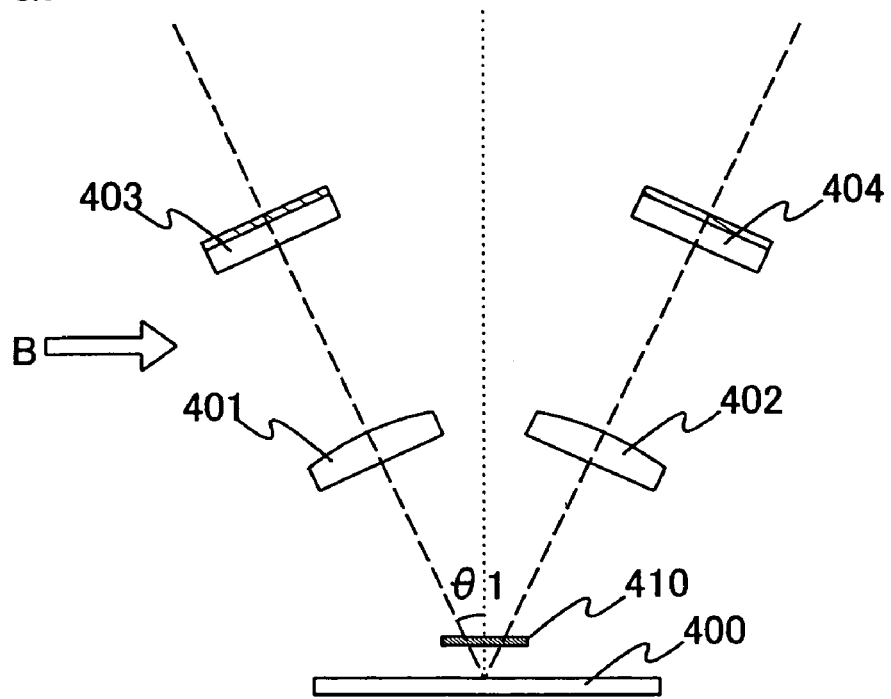
FIGS. 9A and 9B show an optical system of a laser irradiation apparatus.
Figure 9B:
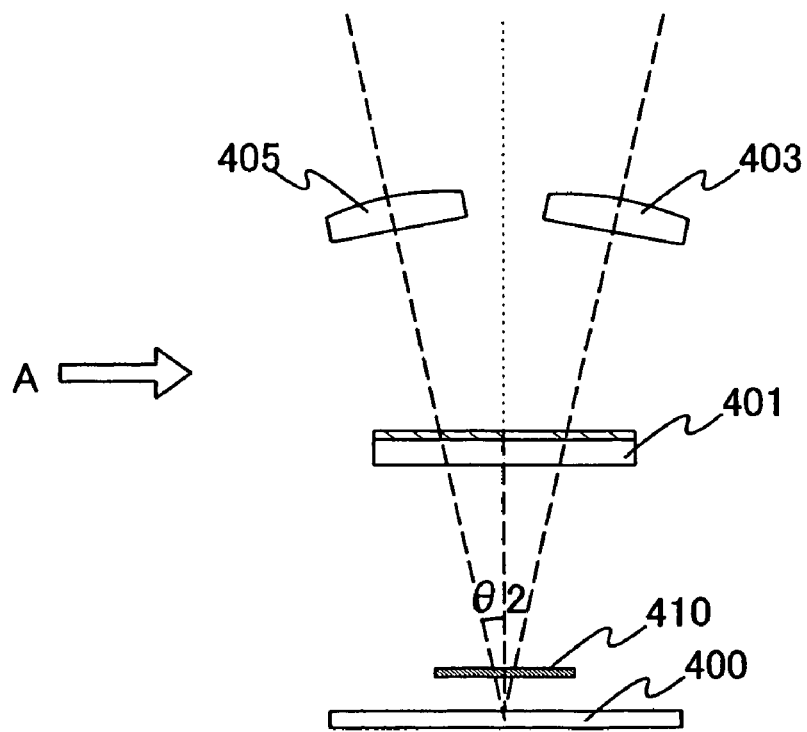

FIGS. 9A and 9B illustrate exemplary optical systems according to the embodiment. FIG. 9A shows a side view of an optical system of the laser irradiation apparatus of the present invention. FIG. 9B shows a side view that is viewed along the direction of the arrow B in the FIG. 9A. FIG. 9A shows a side view that is viewed along the direction of the arrow A in FIG. 9B.

FIG. 9 shows an optical system which is adopted synthesize the four beam spots into a single beam spot. In this embodiment, the number of beam spot for synthesizing is not limited to this, the number may higher than or equal to 2 and lower than or equal to 8.

Figure 10:
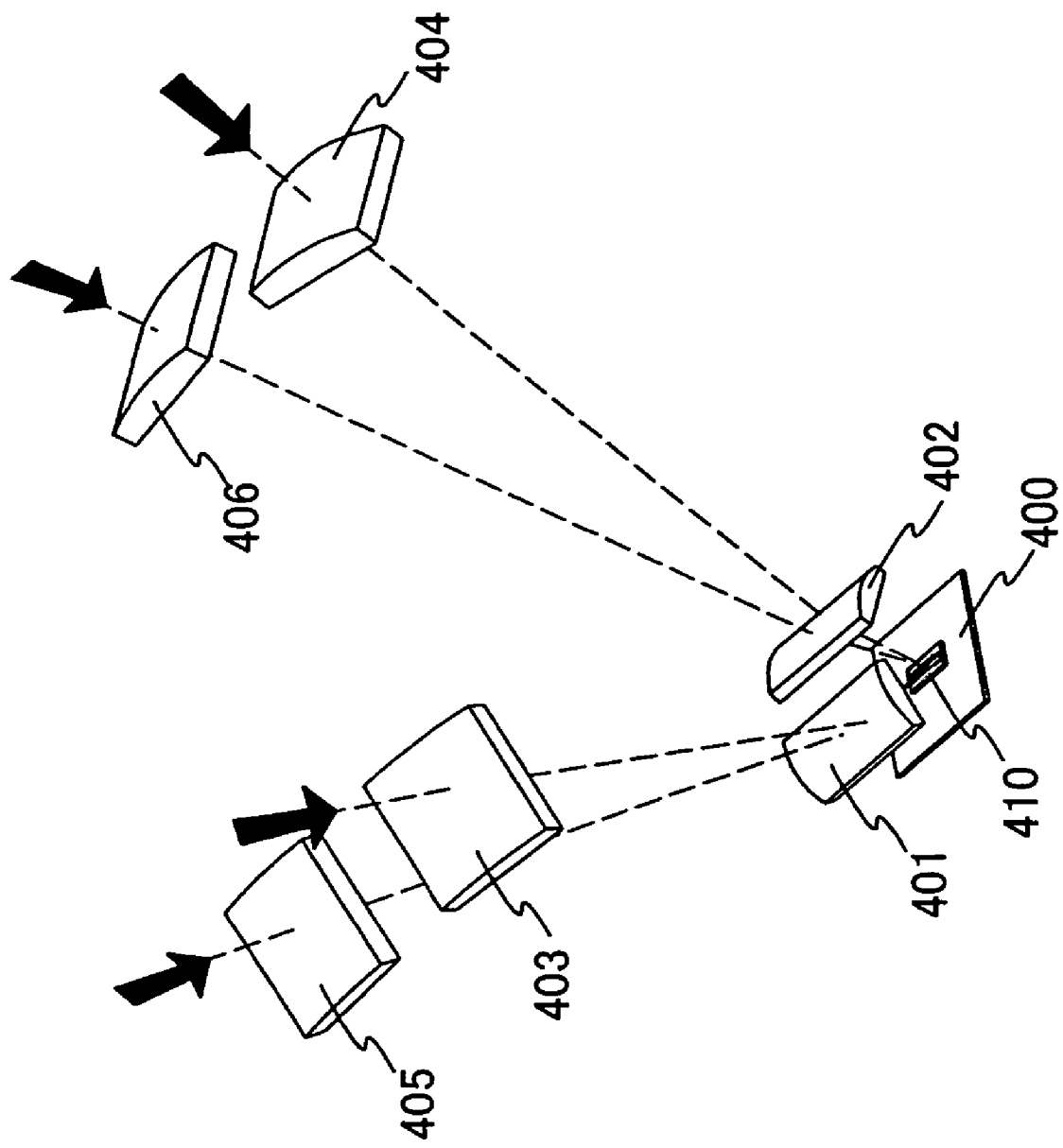
FIG. 10 shows an optical system of a laser irradiation apparatus.

Reference numerals 401 to 405 are cylindrical lenses. The optical system of this embodiment includes six cylindrical lenses, not shown in FIGS. 9A and 9B. FIG. 10 shows an oblique view of optical system shown in FIG. 9. Laser beam pass through the respective cylindrical lenses 403 to 406 from the different laser oscillating apparatus.

The laser beams shaped by the cylindrical lenses 403, 405 enter the cylindrical lens 401. The entered laser beams are shaped by the cylindrical lenses, and enter the slit 410 to be partially cut and impinge upon the object to be processed 400. On the other hand, the laser beams shaped by the cylindrical lenses 404, 406 enter the cylindrical lens 402. The entered laser beams are shaped by the cylindrical lenses, and enter the slit 410 to be partially cut and impinge upon the object to be processed 400.

The beam spots of the laser beams on the object to be processed 400 are partially superpositioned on each other so as to be synthesized into a single beam spot.

A focal length of the cylindrical lenses 401, 402 closest to the object to be processed 400 is defined to be 20 mm, and a focal length of the cylindrical lenses 403 to 406 is defined to be 150 mm. In this embodiment, the cylindrical lenses 401, 402 are so positioned as to apply the laser beams to the object to be processed 400 at an incidence angle of 25° (an incident angle $\theta_1$), whereas the cylindrical lenses 403 to 406 are so positioned as to apply the laser beams to the cylindrical lenses 401, 402 at an incidence angle of 10° (an incident angle $\theta_2$).

A focal lengths and incidence angles of each lens may properly be defined by the designer. Further, the number of cylindrical lenses is not limited to this and the optical system used is not limited to cylindrical lenses. It is sufficient that in the present invention, there is used an optical system that is capable of processing the beam spot of a laser light oscillated from each laser oscillating apparatus so that there is obtained a shape and energy density suited for the crystallization of a semiconductor film and of synthesizing the beam spots of all laser lights into single beam spot by having the beam spots overlap each other.

It should be noted here that in this embodiment, there has been described an example where four beam spots are synthesized. In this case, there are provided four cylindrical lenses, which respectively correspond to four laser oscillating apparatuses, and two cylindrical lenses that correspond to the four cylindrical lenses. When beam spots, whose number is n (n=2, 4, 6, or 8), are combined, there are provided n cylindrical lenses, which respectively correspond to n laser oscillating apparatuses, and n/2 cylindrical lenses that correspond to the n cylindrical lenses. When beam spots, whose number is n (n=3, 5, or 7), are combined, there are provided n cylindrical lenses, which respectively correspond to n laser oscillating apparatuses, and (n+1)/2 cylindrical lenses that correspond to the n cylindrical lenses.

Next, a description is made on an optical system of the laser irradiation apparatus of the present invention using eight laser oscillating apparatus.

Figure 11:
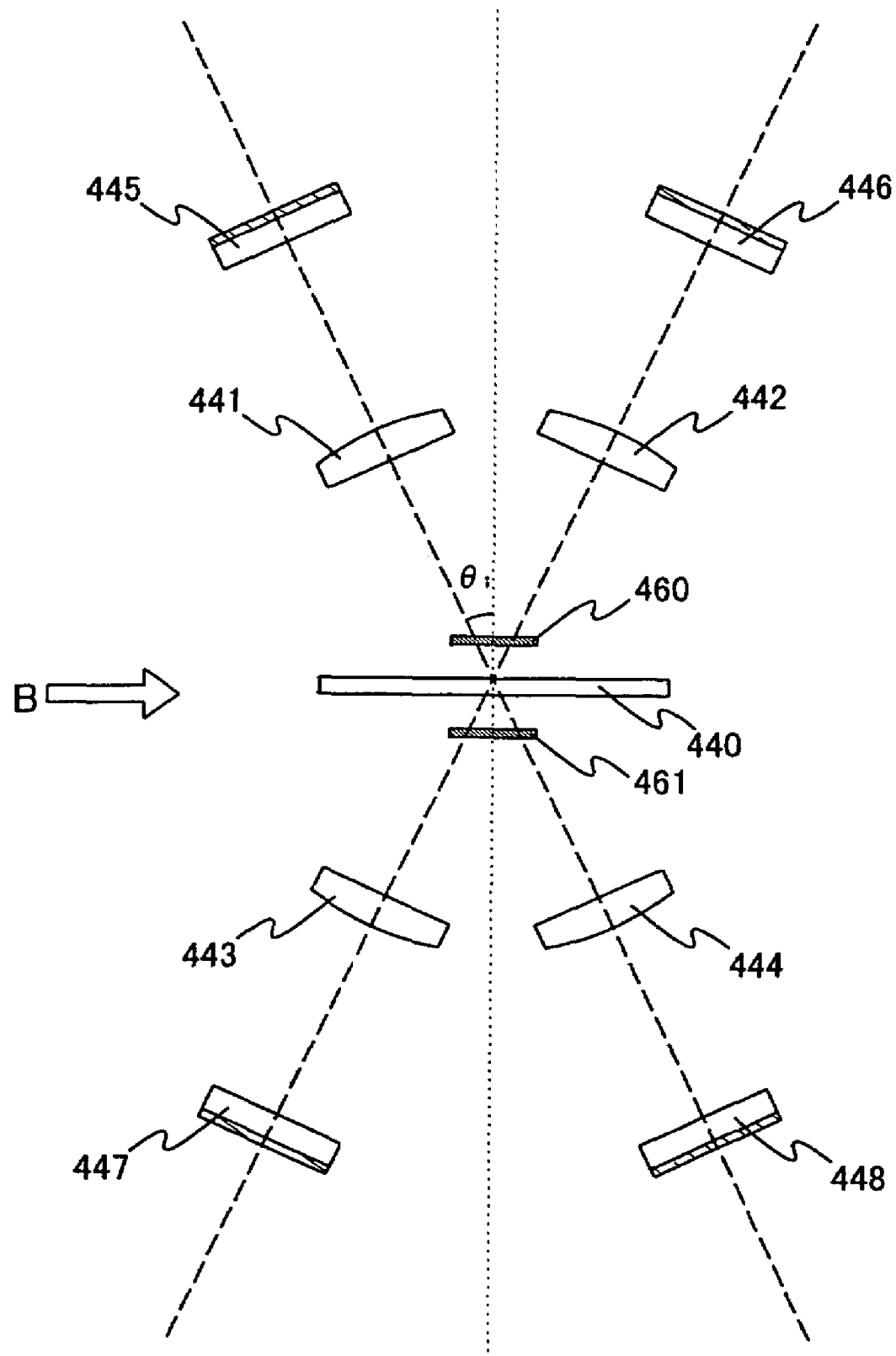
FIG. 11 shows an optical system of a laser irradiation apparatus.
Figure 12:
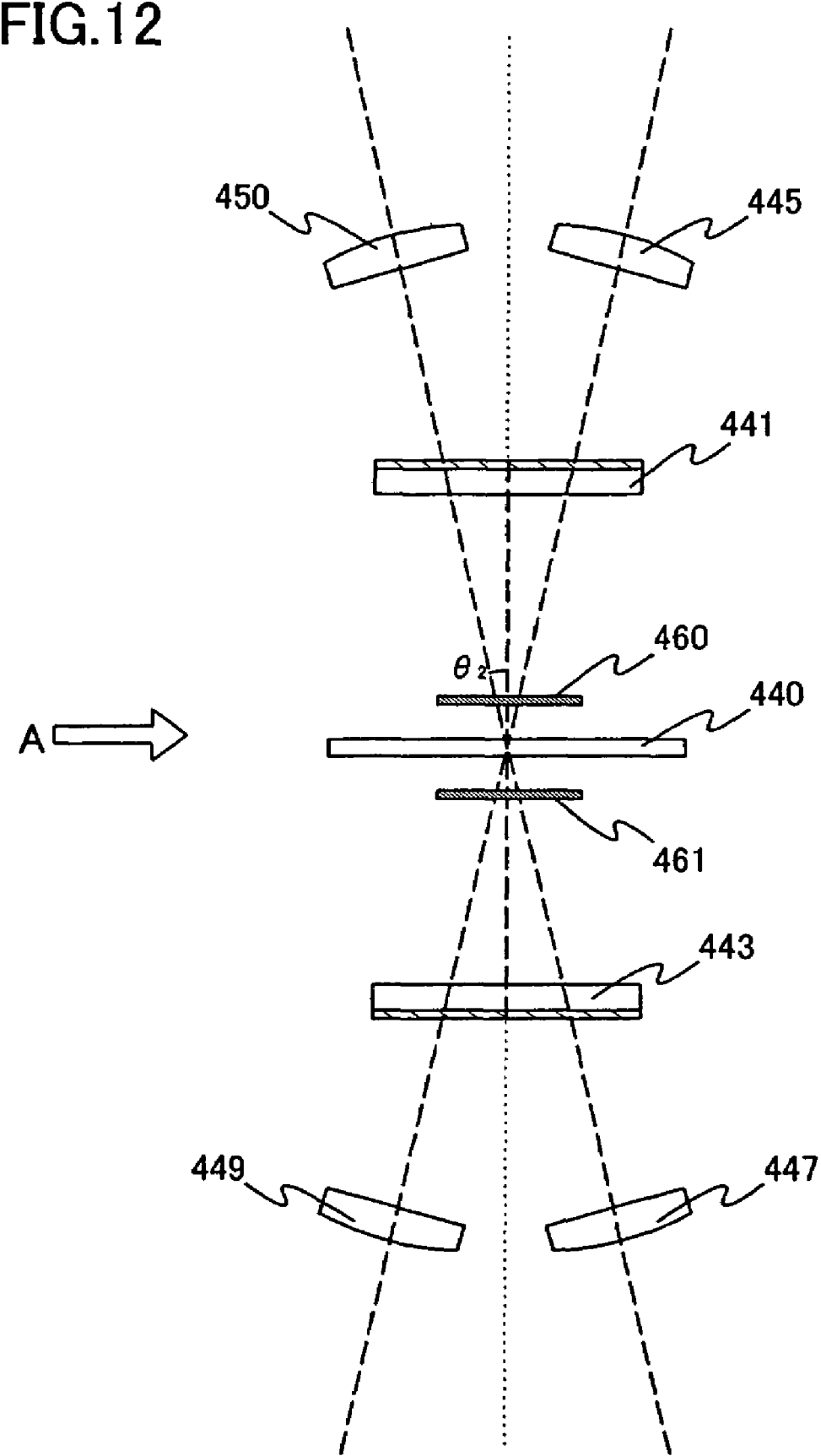
FIG. 12 shows an optical system of a laser irradiation apparatus.

FIGS. 11, 12 illustrate exemplary optical systems according to the embodiment. FIG. 11 shows a side view of an optical system of the laser irradiation apparatus of the present invention. FIG. 12 shows a side view that is viewed along the direction of the arrow B in FIG. 11. FIG. 11 shows a side view that is viewed along the direction of the arrow A in FIG. 12.

This embodiment shows an optical system which is adopted synthesize the eight beam spots into a single beam spot. In this embodiment, the number of beam spots for synthesizing is not limited to this, the number may be higher than or equal to 2 and lower than or equal to 8.

Figure 13:
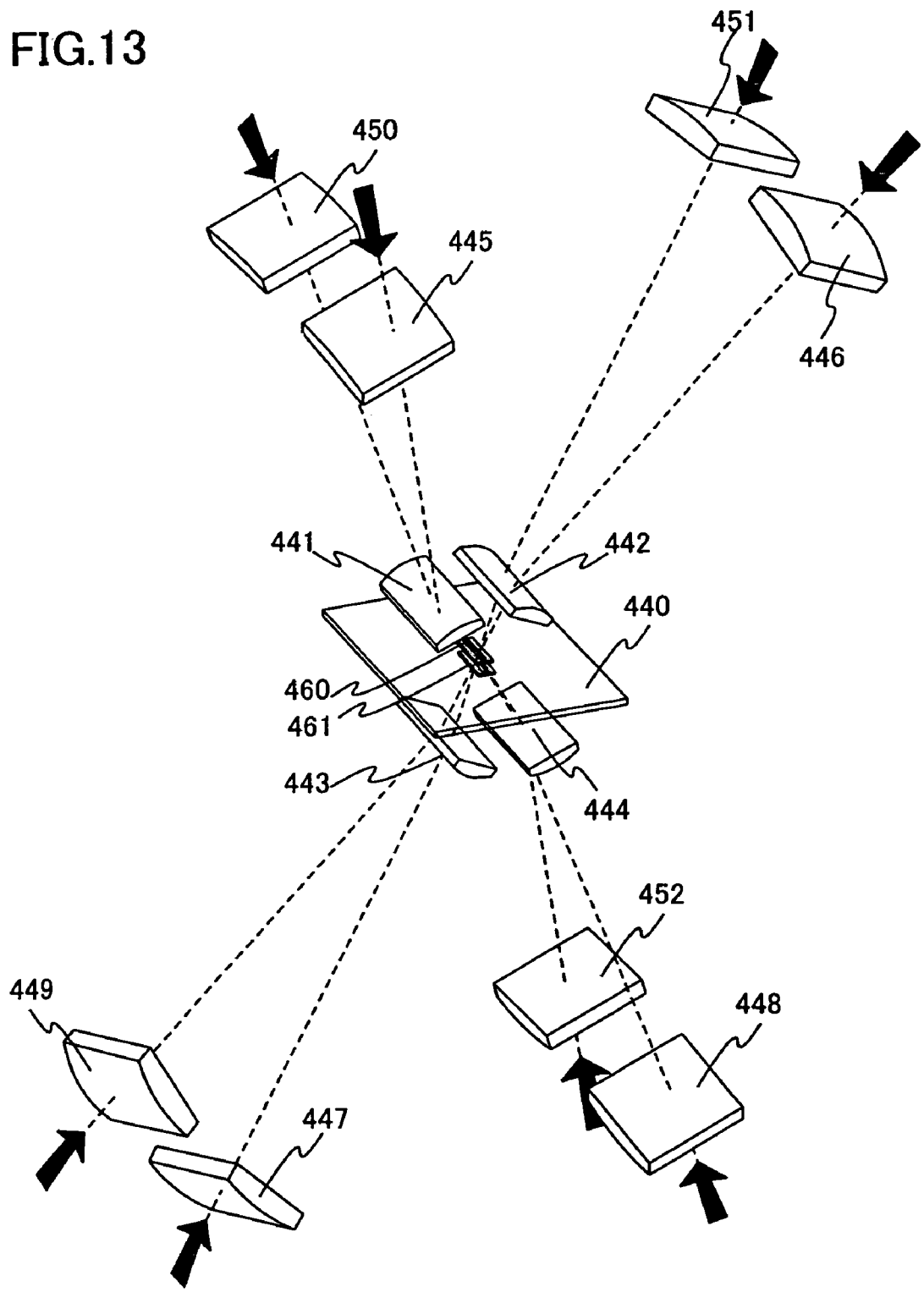
FIG. 13 shows an optical system of a laser irradiation apparatus.

Reference numerals 441 to 450 are cylindrical lenses. The optical system of this embodiment includes twelve cylindrical lenses 441 to 452, not shown in FIGS. 11, 12. FIG. 13 shows an oblique view of optical system shown in FIGS. 11, 12. Laser beams pass through the respective cylindrical lenses 441 to 444 from the different laser oscillating apparatuses.

The laser beams shaped by the cylindrical lenses 450 and 445 enter the cylindrical lens 441. The entered laser beams are shaped by the cylindrical lens 441, and enter the slit 460 to be partially cut and impinge upon the object to be processed 440. The laser beams shaped by the cylindrical 451, and 446 enter the cylindrical lens 442. The entered laser beams are shaped by the cylindrical lens 442, and enter the slit 460 to be partially cut and impinge upon the object to be processed 440. The laser beams shaped by the cylindrical lenses 449, 447 enter the cylindrical lens 443. The entered laser beams are shaped by the cylindrical lens 443, and enter the slit 461 to be partially cut and impinge upon the object to be processed 440. The laser bears shaped by the cylindrical lenses 452, 448 enter the cylindrical lens 444. The entered laser beams are shaped by the cylindrical lens 444, and enter the slit 461 to be partially cut and impinge upon the object to be processed 440.

The beam spots of the laser beams on the object to be processed 440 are partially superpositioned on each other so as to be synthesized into a single beam spot.

A focal length of the cylindrical lenses 441 to 444 closest to the object to be processed 440 is defined to be 20 mm, and a focal length of the cylindrical lenses 445 to 452 is defined to be 150 mm. In this embodiment, the cylindrical lenses 441 to 444 are so positioned as to apply the laser beams to the object to be processed 440 at an incidence angle of 25° (an incident angle $\theta_1$), whereas the cylindrical lenses 445 to 452 are so positioned as to apply the laser beams to the cylindrical lenses 441 to 444 at an incidence angle of 10° (an incident angle $\theta_2$).

A focal lengths and incidence angles of each lenses may properly be defined by the designer. Further, the number of cylindrical lenses is not limited to this and the optical system for using is not limited to cylindrical lenses. It is sufficient that in the present invention, there is used an optical system that is capable of processing the beam spot of a laser light oscillated from each laser oscillating apparatus so that there is obtained a shape and energy density suited for the crystallization of a semiconductor film and of synthesizing the beam spots of all laser lights into single beam spot by having the beam spots overlap each other.

In this embodiment, an example of synthesizing eight beam spots is described. In this case, there are eight cylindrical lenses corresponding to the respective eight laser oscillating apparatuses, and four cylindrical lenses corresponding to the respective eight cylindrical lenses.

In a case where 5 or more beam spots are synthesized, it is preferred in the light of the location of the optical system or interference that the fifth or the subsequent laser beam may be irradiated from the opposite side of the substrate. Thus, the substrate must have light transmission.

If an incidence plane is defined as a plane perpendicular to an irradiation face and including a shorter side or a longer side of the beams before synthesis thereof when the shape of the respective beams is assumed to be a rectangular, it is desirable that the incidence angle $\theta$ of the laser beam satisfies $\theta \geq \arctan (W/2d)$ where W denotes a length of the shorter or a longer side included in the incidence plane, and d denotes a thickness of the substrate disposed on the irradiation face and being transparent to the laser beam. This logic needs to be realized about each laser beam before synthesized. When a path of a laser beam is out of the incidence plane, the incidence angle $\theta$ thereof is defined by one obtained by projection of the path of the laser beam to the incidence face. Irradiating the laser beam at this incidence angle $\theta$ provides uniform laser radiation free from interference between light reflected by the surface of the substrate and light reflected by a backside of the substrate. The above logic is made with the proviso that the substrate has a reflectivity of 1. In reality, many of the substrates have reflectivity on the order of 1.5 so that a calculated value based on the reflectivity of 1.5 can be greater than the angle determined by the above logic. However, the energy of the beam spot is attenuated at longitudinal opposite ends and hence, the effect of interference at the opposite end portions is insignificant. Thus, the above logical value provides an adequate effect to attenuate interference. The inequality using above $\theta$ is not applied to substrates except those which are transparent to the laser beams.

This embodiment may be implemented in combination with Embodiment 1.

Embodiment 3

The manufacturing method of a semiconductor device using the laser irradiation apparatus or the laser irradiation method of the present invention will be described in this embodiment. Further, although a light emitting device is explained as one of the example of semiconductor device, the semiconductor device which can be manufactured by using the present invention is not limited thereto, a liquid crystal display device or other semiconductor devices can be applicable.

A light emitting device is the semiconductor device in which light emitting elements and means for applying current thereto are provided in each of plural pixels. An organic light emitting diode (OLED) has a layer including an electroluminescence material that generates an electroluminescence by applying an electric field (hereinafter, an electroluminescence layer), an anode layer, and a cathode layer. The electroluminescence layer is formed between the anode and the cathode and formed by single layer or plural layers. An inorganic material may be contained in these layers.

Figure 14A:
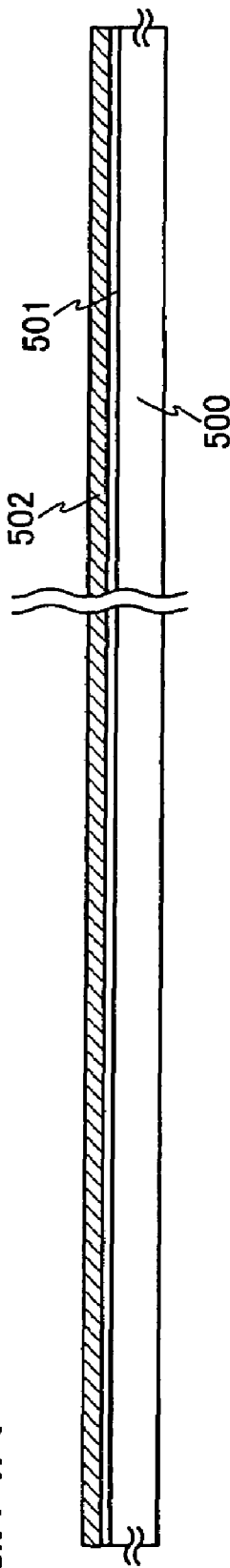
FIGS. 14A to 14C show a method of manufacturing a semiconductor device using a laser irradiation apparatus of the present invention.

As shown in FIG. 14, in this embodiment, a substrate 500 is used, which includes barium borosilicate glass or alumino borosilicate glass, a quartz substrate, a silicon substrate, a metal substrate, or stainless substrate formed with an insulating film on the surface may be used. A plastic substrate having heat resistance enduring a treatment temperature of this embodiment also may be used.

Next, a base film 501 including an insulating film such as a silicon oxide film, a silicon nitride film, or a silicon oxide nitride film is formed on the substrate 500 by publicly known method (such as sputtering, LPCVD and plasma CVD). In this embodiment, single layer base film is formed as the base film 501, however, the base film 501 can be formed by stacking at least two layers of the above-mentioned insulating film.

Next, an amorphous silicon film 502 having a thickness of 50 nm has been formed on the base film 501 by plasma CVD. Although depending upon its hydrogen content, it is desirable that the amorphous silicon film is heated preferably at 400 to 550° C. for several hours, dehydrogenation treatment is performed, the hydrogen content is made 5 or less atomic %, and the step of crystallization is performed. Moreover, the amorphous silicon film may be formed by other methods such as sputtering, vapor deposition or the like, however, it is desirable that impurity elements such as oxygen, nitrogen and the like contained in the film have been previously and sufficiently reduced.

It should be noted that not only silicon but also silicon germanium can be used for semiconductor film. When silicon germanium is used, it is preferable that the density of germanium is in the order of 0.01 to 4.5 atomic %.

Now, both of the base film 501 and the amorphous silicon film 502 are fabricated by plasma CVD, and at this time, the base film 501 and the amorphous silicon film 502 may be formed in vacuum in series. The pollution of the surface can be prevented by firstly performing the step of not exposing to the ambient air atmosphere after the base film 501 has been formed, and the variation of the characteristics of the fabricated TFT could be reduced.

Figure 14B:
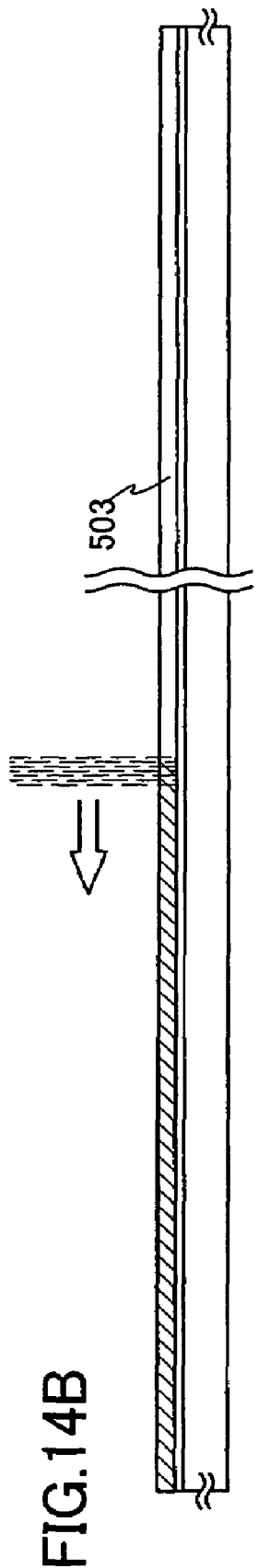

As shown in FIG. 14B, the amorphous silicon film 502 is crystallized by using the laser crystallization method. For the laser crystallization method, the laser irradiation apparatus or the laser irradiation method is used. Of course, besides the laser crystallization method, this may be combined with other known crystallization methods (thermal crystallization method using RTA or furnace anneal, thermal crystallization method using a metal element to promote crystallization, or the like).

When a crystallization of an amorphous semiconductor film is conducted, it is preferable that the second harmonic through the fourth harmonic of basic wave is applied by using the solid-state laser that is capable of continuous oscillation in order to obtain a crystal in large grain size. Typically, it is preferable that the second harmonic (with a wavelength of 532 nm) or the third harmonic (with a wavelength of 355 nm) of an Nd: $YVO_4$ laser (basic wave of 1064 nm) is applied. Specifically, laser beams emitted from the continuous wave type $YVO_4$ laser is converted into a harmonic by using the non-linear optical elements thereby obtaining a laser beam of output 10 W. Also, a method of emitting a harmonic by applying crystal of $YVO_4$ and the non-linear optical elements into a resonator can be used. Then, more preferably, the laser beams are formed so as to have a rectangular shape or an elliptical shape by an optical system, thereby irradiated to an object to be processed. At this time, the energy density of approximately 0.01 to 100 $MW/cm^2$ (preferably 0.1 to 10 $MW/cm^2$) is required. The amorphous semiconductor film 502 is moved at approximately 10 to 2000 cm/s rate relatively corresponding to the laser beams so as to irradiate the semiconductor film.

Note that, a gas laser or solid-state laser of continuous wave type or pulse oscillating type can be used. The gas laser such as an excimer laser, Ar laser, Kr laser and the solid-state laser such as YAG laser, $YVO_4$ laser, YLF laser, $YAlO_3$ laser, glass laser, ruby laser, alexandrite laser, Ti: sapphire laser, and $Y_2O_3$ laser can be used as the laser beam. Also, crystals such as YAG laser, $YVO_4$ laser, YLF laser, and $YAlO_3$ laser wherein Cr, Nd, Er, Ho, Ce, Co, Ti Yb or Tm is doped can be used as the solid-state laser. A basic wave of the lasers is different depending on the materials of doping, therefore a laser beam having a basic wave of approximately 1 μm is obtained. A harmonic corresponding to the basic wave can be obtained by using non-linear optical elements.

By the above-mentioned laser crystallization, a crystallized semiconductor film 503 with improved crystallinity is formed.

Figure 14C:
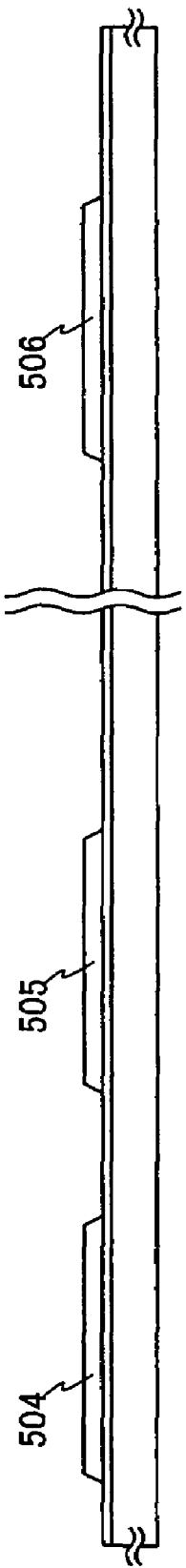

The island like semiconductor forms 504 to 506 that will be used as an active layer of TFT are formed by performing patterning processing the crystallized semiconductor film 503 (FIG. 14C). After the active layers 504 to 506 are formed, a small amount of impurity element (boron or phosphorus) may be doped in order to control a threshold value of the TFT.

Figure 15A:
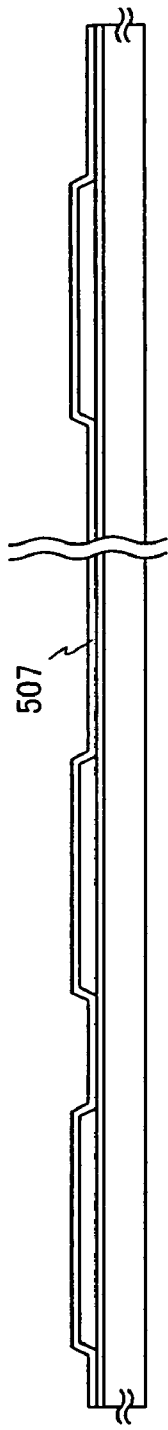
FIGS. 15A to 15D show a method of manufacturing a semiconductor device using a laser irradiation apparatus of the present invention.

Next, as shown in FIG. 15A, a gate insulating film 507 whose major component is silicon oxide or silicon nitride was formed by covering active layers 504 to 506. In this embodiment, TEOS (Tetraethyl Orthosilicate) and $O_2$ were mixed by a plasma CVD method, and a silicon oxide film was formed by discharging under the conditions of the reaction pressure 40 Pa, the substrate temperature 300 to 400° C., the high frequency (13.56 MHz), and the power density in the range of 0.5 to 0.8 $W/cm^2$. Then, the silicon oxide film thus prepared can obtain an excellent characteristic as a gate insulating film by thermo-annealing at 400 to 500° C. Moreover, aluminum nitride can be used as a gate insulating film. Since aluminum nitride is comparatively high at thermal conductivity, the heat generated at a TFT can be effectively diffused. Moreover, after silicon oxide and silicon oxide nitride and the like not containing aluminum have been formed, a layer in which layers of aluminum nitride are laminated may be used as a gate insulating film.

Figure 15B:
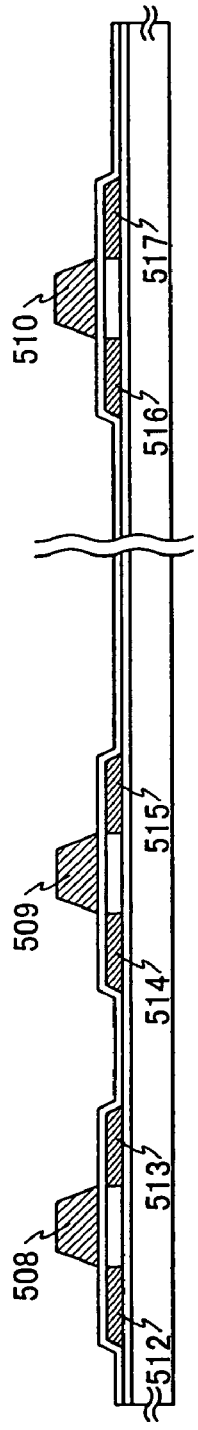

Then, as shown in FIG. 15B, a conductive film having a thickness in the range from 100 to 500 nm is formed on the gate insulating film 507, and gate electrodes 508 to 510 are formed by performing the patterning these.

It should be noted that in this embodiment, a gate electrode is formed with elements selected from Ta, W, Ti, Mo, Al, and Cu or with an alloy material or a compound material whose major components are the foregoing elements. Moreover, a semiconductor film represented by a polycrystalline silicon film into which impurity elements such as phosphorus and the like have been doped may be also used. Moreover, it may be also a laminated layer including a plurality of layers, which is not an electrically conductive film including a single layer.

For example, it is preferable that the laminated layer is formed according to the combination of a first electrically conductive film being formed with tantalum nitride (TaN) and a second electrically conductive film being formed with W, the combination of the first electrically conductive film being formed with tantalum nitride (TaN) and the second electrically conductive film being formed with Al, and the combination of the first electrically conductive film being formed with tantalum nitride (TaN) and the second electrically conductive film being formed with Cu (copper). Moreover, a semiconductor film represented by a polycrystalline silicon film in which impurity elements such as phosphorus and the like have been doped as the first electrically conductive film and the second electrically conductive film and Ag—Pd—Cu alloy may be also used.

Moreover, it is not limited to two-layers structure, for example, it may be a three-layers structure in which a tungsten film, an alloy (Al—Si) film including aluminum and silicon, and a titanium nitride film have been in turn laminated. Moreover, in the case where it is made as a three-layers structure, tungsten nitride instead of tungsten may be used, an alloy film of aluminum and titanium (Al—Ti) instead of an alloy (Al—Si) film of aluminum and silicon may be used, and a titanium film instead of a titanium nitride film may be used.

It should be noted that it is important that the most suitable method of etching and kind of an etchant are selected according to those materials of electrically conductive films.

Next, the step in which n-type impurity element is added is performed, and n-type impurity regions 512 to 517 are formed. Here, it was performed by an ion doping method using phosphine ($PH_3$).

Figure 15C:
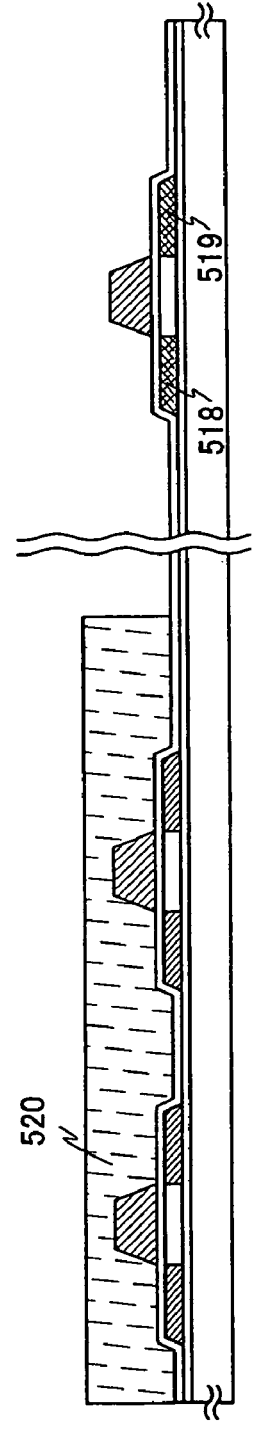

Next, as shown in FIG. 15C, the region where n-channel type TFT has been formed is covered with a resist mask 520, the step in which a p-type impurity element is added was performed to a region where a p-channel type TFT is formed and p-type impurity regions 518 and 519 have been formed. Here, diborane ($B_2H_6$) was used, and it was added by an ion doping method.

Then, for the purpose of controlling an electrically conductive type, the step in which an impurity element added to the respective semiconductor layers in an insular shape is activated is performed. This step is performed by a thermal annealing method using a furnace annealing oven. Except for this, a laser annealing method or rapid thermal annealing method (RTA method) can be applied. As for the thermal annealing method, it is performed under the conditions of oxygen concentration being 1 ppm or less, preferably, in the nitrogen atmosphere of 0.1 ppm or less, at 400 to 700° C., representatively, at 500 to 600° C., but in this embodiment, a thermal treatment is performed at 500° C. for 4 hours. However, in the case where the gate electrodes 508 to 510 are weak at heating, after an interlayer insulating film (whose major component is silicon) has been formed for the purpose of protecting the wirings or the like, it is preferable that the activation is performed.

If laser annealing method is used, laser that used in the crystallization can be used. If activation is conducted, moving speed is set same as that of the crystallization, and energy density of approximately 0.01 to 100 $MW/cm^2$ (preferably, 0.01 to 10 $MW/cm^2$) is needed. When the crystallization is conducted, continuous wave laser may be used, and when the activation is conducted, the pulse oscillating laser may be used.

Furthermore, the thermal treatment is performed at 300 to 450° C. for 1 to 12 hours in the atmosphere containing hydrogen of 3 to 100%, and the step in which a semiconductor layer in an insular shape is hydrogenated. This step is a step in which the dangling bond of the semiconductor layer is terminated with a hydrogen thermally excited. As the other means of hydrogenation, a plasma hydrogenation (using a hydrogen excited by plasma) may be performed.

Figure 15D:
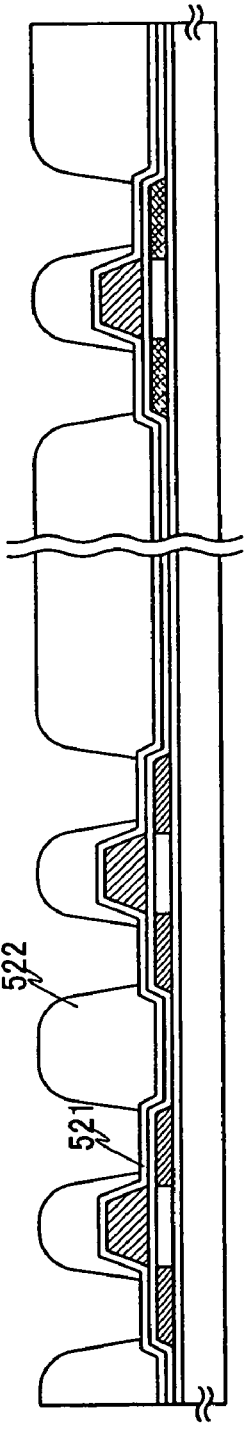

Next, as shown in FIG. 15D, a first inorganic insulating film 521 including silicon oxide nitride having a thickness in the range from 10 to 200 nm is formed by utilizing a CVD method. It should be noted that as for the first inorganic insulating film is not limited to the silicon oxide nitride film and it may be an inorganic insulating film containing nitrogen, with which going in and out of water into an organic resin film formed later can be suppressed, for example, silicon nitride, aluminum nitride or aluminum oxide nitride can be used. In addition, aluminum nitride has comparative high thermal conductivity, and can diffuse effectively heat generated at TFT or a light emitting element.

Next, an organic resin film 522 including a positive type photosensitive organic resin is formed on the first inorganic insulating film 521. Although in this embodiment, the organic resin film 522 is formed using a positive type photosensitive acrylic, the present invention is not limited to this. In this embodiment, the organic resin film 522 is formed by coating the positive type photosensitive acrylic by a spin coat method and sintering it. It should be noted that the film thickness of the organic resin film 522 is made so as to be in the order of 0.7 to 5 μm (further preferably, in the range from 2 to 4 μm) after the sintering it.

Next, the portion where the opening is contemplated to form is exposed to the light using a photomask. Then, after it has been developed with a developer whose major component is TMAH (Tetramethyl Ammonium Hydroxide), the substrate is dried and the sintering is performed at 220° C. for about one hour. Then, as described in FIG. 15D, the opening is formed on the organic resin film 522, and it becomes a state where one portion of the first inorganic insulating film 521 is exposed on the relevant opening.

It should be noted that since a positive type photosensitive acrylic is colored in a light brown, when the light emitted from the light emitting element goes toward the substrate side, the decolorizing treatment is provided. In this case, prior to the sintering, the whole of the photosensitive acrylic after the development is again exposed to the light. The exposure to the light at this time is made to completely perform the exposure by irradiating a rather intense light and making the irradiating time longer comparing to the exposure for forming the opening. For example, when a positive type acrylic resin having a film thickness of 2 μm is decolorized, in the case where a magnification projection aligner (concretely, MPA made by Canon, Co., Ltd.) utilizing the multiwavelength light including g line (436 nm), h line (405 nm) and i line (365 nm), which are spectral beams of super high pressure mercury vapor lamp is used, the radiation is performed for about 60 seconds. The positive type acrylic resin is completely decolorized by exposing it to the beam.

Moreover, in this embodiment, after the development, the sintering is performed at 220° C., however, it may be sintered at a high temperature of 220° C. after the sintering is performed at a low temperature of about 100° C. as a prebake following the development.

Figure 16A:
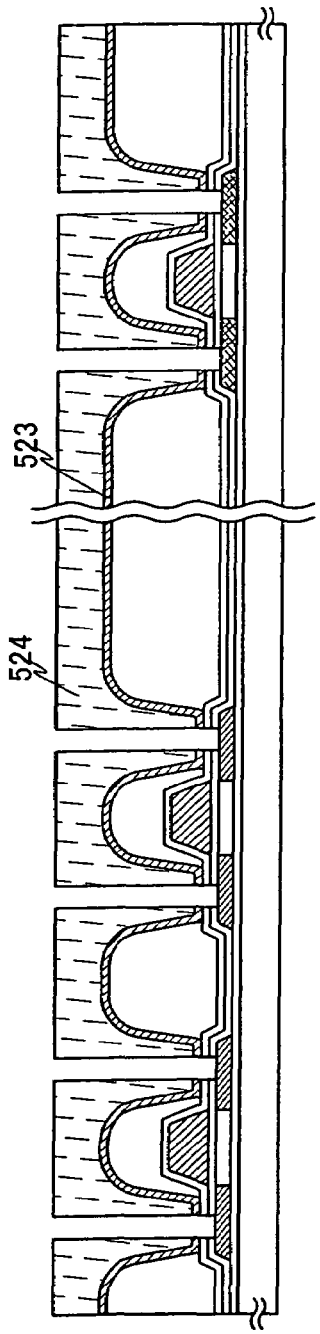
FIGS. 16A to 16C show a method of manufacturing a semiconductor device using a laser irradiation apparatus of the present invention.

Then, as shown in FIG. 16A, the second inorganic insulating film 523 including silicon nitride covering the relevant opening to which one portion of the first inorganic insulating film 521 has been exposed and the organic resin film 522, is formed into a film by utilizing a RF sputtering method. It is preferable that the film thickness of the second inorganic insulating film 523 is in the range from about 10 to 200 nm. Moreover, the second inorganic insulating film is not limited to silicon oxide nitride film, an inorganic insulating film containing nitrogen capable of suppressing the going in and out of water to the organic resin film 522 may be available, for example, silicon nitride, aluminum nitride or aluminum oxide nitride can be used.

It should be noted that as for a silicon oxide nitride film or an aluminum oxide nitride film, the ratio of atomic % of its oxygen and nitrogen is involved in their barrier character. The higher the rate of nitrogen to oxygen is, the more the barrier character is enhanced. Moreover, concretely, it is preferable that the ratio of nitrogen is higher than the ratio of oxygen.

Moreover, the film formed using a RF sputtering method is high at denseness and excellent at barrier character. As for the conditions of the RF sputtering, for example, in the case where a silicon oxide nitride film is formed into a film, $N_2$, Ar, and $N_2O$ are allowed to flow using Si target so that the flow ratio of gases becomes 31:5:4, and the film is formed under the conditions of the pressure 0.4 Pa and the power 3000 W. Moreover, for example, in the case where a silicon nitride film is formed, $N_2$ and Ar within the chamber are allowed to flow using Si target so that the flow ratio of the gasses becomes 20:20, and the film is formed under the conditions of the pressure 0.8 Pa, the power 3000 W, and the film formation temperature of 215° C.

The first interlayer insulating film is formed with this organic resin film 522, the first inorganic insulating film 521 and the second inorganic insulating film 523.

Next, as shown in FIG. 16A, a resist mask 524 is formed at the, opening of the organic resin film 522, and a contact hole is formed on the gate insulating film 507, the first inorganic insulating film 521 and the second inorganic insulating film 523 by utilizing a dry etching method.

The impurity regions 512 to 515, 518 and 519 are in a state being partially exposed by opening this contact hole. The conditions of this dry etching are appropriately set according to the materials of the gate insulating film 507, the first inorganic film 521, and the second inorganic insulating film 523. Since in this embodiment, silicon oxide is used for the gate insulating film 507, silicon oxide nitride is used for the first inorganic insulating film 521 and silicon nitride is used for the second inorganic insulating film 523, first, the second inorganic insulating film 523 including silicon nitride and the first inorganic insulating film 521 including silicon oxide nitride are etched by making $CF_4$, $O_2$, and He as an etching gas, and then, the gate insulating film 507 including silicon oxide is etched using $CHF_3$. It should be noted that upon etching, it is essential to make it so that the organic resin film 522 is not exposed at the opening.

Figure 16B:
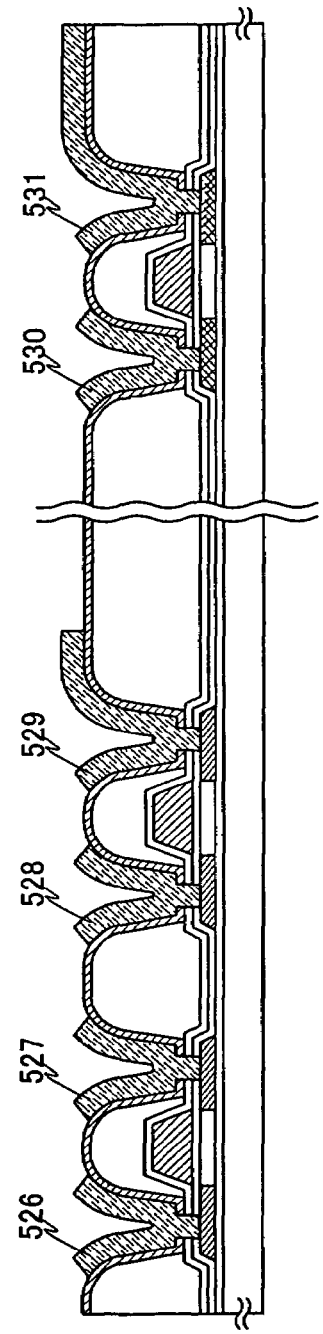

Next, an electrically conductive film is formed into a film on the second inorganic insulating film 523 so as to cover the contact hole, and the wirings 526 to 531 connected to the impurity regions 512 to 515, 518 and 519 are formed by performing the patterning of these (FIG. 16B).

It should be noted that in this embodiment, an electrical conductive film having a three-layers structure in which a Ti film having a thickness of 100 nm, Al film having a thickness of 300 nm and a Ti film having a thickness of 150 nm have been formed in series on the second inorganic insulating film 523 by a sputtering method, but the present invention is not limited to this configuration. It may be formed with an electrically conductive film having a single layer, or it may be formed with an electrically conductive film including a plurality of layers except for three-layers one. Moreover, as for material, the present invention is not limited to this, too.

For example, after the Ti film has been formed into a film, an electrically conductive film in which an Al film containing Ti is laminated may be used, or an electrically conductive film in which an Al film containing W may be used after the formation of the Ti film.

Next, an organic resin film that is to be a bank is formed on the second inorganic insulating film 523. Although in this embodiment, a positive type photosensitive acrylic is used, the present invention is not limited to this. In this embodiment, an organic resin film is formed by coating a positive type photosensitive acrylic by a spin coat method, and by sintering it. It should be noted that the film thickness of the organic resin film is made so that it becomes in the range of about 0.7 to about 5 μm (more preferably, in the range from 2 to 4 μm) after performing the sintering of it.

Figure 16C:
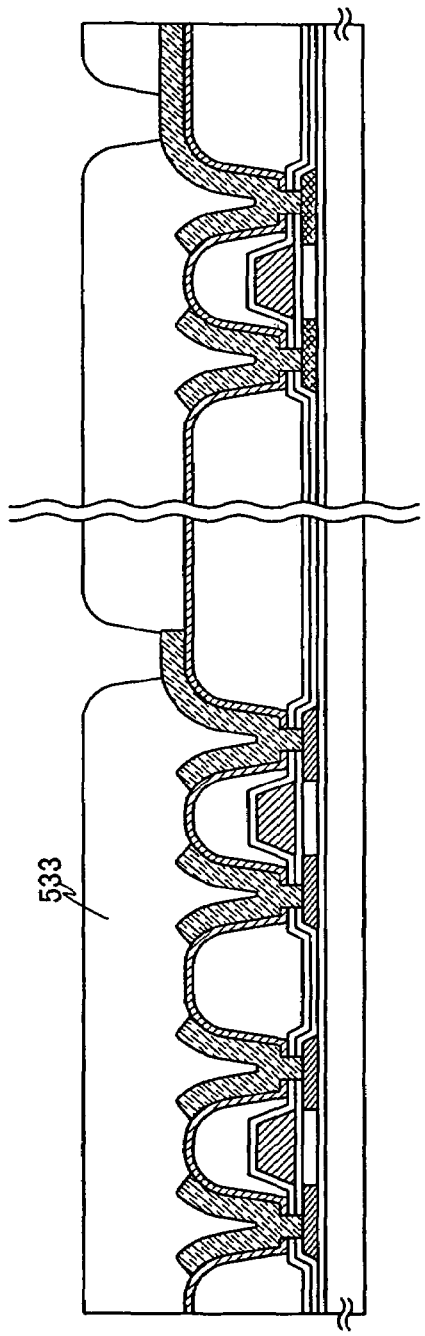

Next, the portion where the opening is contemplated to form is exposed to the light using a photomask. Then, after it has been developed with a developer whose major component is TMAH (Tetramethyl Ammonium Hydroxide), the substrate is dried and the sintering is performed at 220° C. for about one hour. Then, as described in FIG. 16C, a bank 533 having the opening is formed, and the wirings 529 and 531 become a state where one portions of these are exposed at the relevant opening. It should be noted that since a positive type photosensitive acrylic is colored in a light brown, when the light emitted from the light emitting element goes toward the substrate side, the decolorizing treatment is provided. The decolorizing treatment is performed similar to the decolorizing treatment provided to the organic resin film 522.

Since the cross section of the opening can be rounded by utilizing an organic resin having a photosensitivity for the bank, the coverage of the electroluminescent layer and a cathode which are formed later can be made excellent, and failures what is called a shrink that the light emitting region is reduced can be reduced.

Figure 17A:
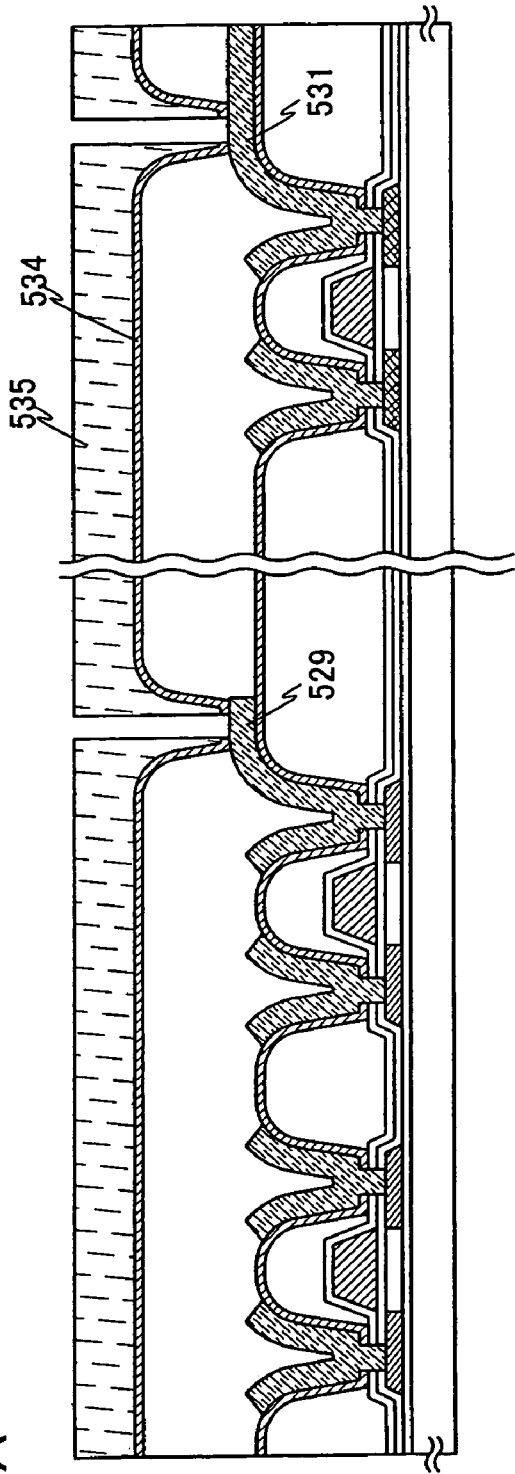
FIGS. 17A and 17B show a method of manufacturing a semiconductor device using a laser irradiation apparatus of the present invention.

Then, as shown in FIG. 17A, the third inorganic insulating film 534 including silicon nitride covering the relevant openings to which portions of the wirings 529 and 531 have been exposed and the bank 533 is formed into a film using a RF sputtering method. It is desirable that the film thickness of the third inorganic insulating film 534 is in the range from about 10 to about 200 nm. Moreover, the third inorganic insulating film is not limited to silicon oxide nitride film, an inorganic insulating film containing nitrogen capable of suppressing the going in and out of water to the bank 533 may be available, for example, silicon nitride, aluminum nitride or aluminum oxide nitride can be used. It should be noted that as for a silicon oxide nitride film or an aluminum oxide nitride film, the ratio of atomic % of its oxygen and nitrogen is largely involved in the barrier character. The higher the rate of nitrogen to oxygen is, the more the barrier character is enhanced. Moreover, concretely, it is desirable that the ratio of nitrogen is higher than the ratio of oxygen.

Next, a resist mask 535 is formed at the opening of the bank 533, and a contact hole is formed on the third inorganic insulating film 534 using a dry etching method.

The wirings 529 and 531 are in a state being partially exposed by opening of this contact hole. The conditions of this dry etching are appropriately set according to the materials of the third inorganic insulating film 534. Since in this embodiment, silicon nitride is used for the third inorganic insulating film 534, the third inorganic insulating film 534 including silicon nitride is etched by making $CF_4$, $O_2$, and He as an etching gas.

It should be noted that upon etching, it is essential to make it so that the bank 533 is not exposed at the opening.

Figure 17B:
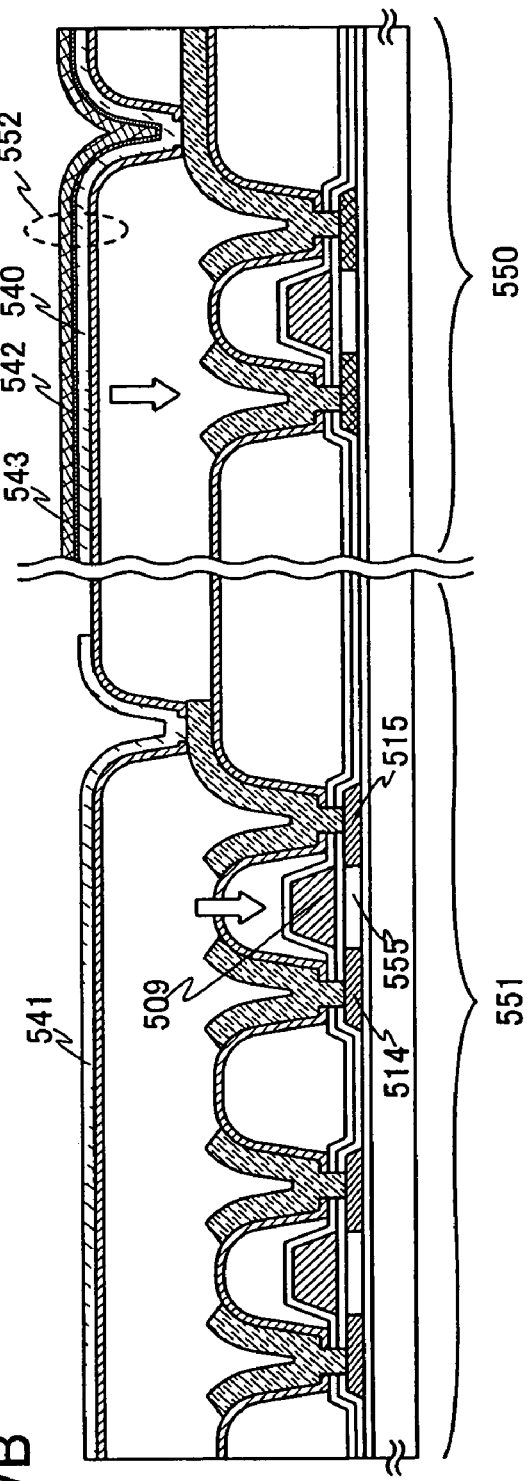

Next, a transparent electrically conductive film, for example, an ITO film is formed in a thickness of 110 nm and the patterning of it is performed, thereby forming a pixel electrode 540 in contact with the wiring 531 and a leading out wiring 541 for obtaining the current generated at diode. Moreover, a transparent electrically conductive film in which zinc oxide in the range from 2 to 20% has been mixed with indium oxide may be used. This pixel electrode 540 becomes an anode of a light emitting element (FIG. 17B).

Next, the electroluminescent layer 542 is formed on the pixel electrode 540 by a vapor deposition method, and further, a cathode (MgAg electrode) 543 is formed by a vapor deposition method. At this time, it is desirable that the heating treatment to the pixel electrode 540 has been performed prior to the formation of the electroluminescent layer 542 and the cathode 543 and water has been completely removed. It should be noted that although in this embodiment, an MgAg electrode is used as a cathode of an OLED, the other known materials, for example, Ca, Al, CaF, MgAg and AlLi might be available if it is an electrically conductive film having a small work function.

It should be noted that AlLi was used as a cathode, it could prevent Li existed in AlLi from entering into the side of the substrate from the third interlayer insulating film 534 by the third interlayer insulating film 534 containing nitrogen.

It should be noted that as an electroluminescent layer 542, known materials are capable of being used. In this embodiment, a two-layers structure including a hole injection layer and an emitting layer is made as an electroluminescent layer, however, any one of a hole transporting layer, an electron injection layer or an electron transportation layer may be provided. In this way, as for the combinations, a variety of examples have been already reported, and any one of those configurations may be used. For example, SAlq, CAlq and the like may be used as an electron transportation layer or a hole blocking layer.

It should be noted that the film thickness of the electroluminescent layer 542 might be made so as to be in the range from 10 to 400 nm (typically in the range from 60 to 150 nm) and the thickness of the cathode 543 might be made so as to be in the range from 80 to 200 nm (typically in the range from 100 to 150 nm).

In this way, a light emitting device having a structure as shown in FIG. 17B is completed. In FIG. 17B, the reference numeral 550 denotes a pixel portion, the reference numeral 551 denotes a driving circuit. In the pixel portion 550, the portion 552 where the pixel electrode 540, the electroluminescent layer 542, and the cathode 543 are superimposed with one another corresponds to an OLED.

It should be noted that the configurations and concrete methods of fabrication of TFTs shown in this embodiment are only examples and the present invention is not limited to those configurations.

It should be noted that actually, when it has been completed to the stage shown in FIG. 17B, it is preferable that it is packaged with a protective film (laminated film, ultraviolet ray hardening resin film or the like) whose air tight sealing characteristic is high and whose amount of degassing is little or a transparent covering material so as not to be exposed to the outside air. At that time, the reliability of the OLED is enhanced if the inside of the covering material is filled with an inert atmosphere and a moisture absorption material (e.g., barium oxide) is disposed inside.

Moreover, this embodiment is capable of being freely combined with Embodiment 1 or Embodiment 2.

Embodiment 4

In this embodiment, a description will be made with regard to relation between a distance between the centers of the laser lights and an energy density, when the laser lights are overlapped with each other. Here, for simplicity in explanation, a case where no slit is provided will be described.

Figure 18:
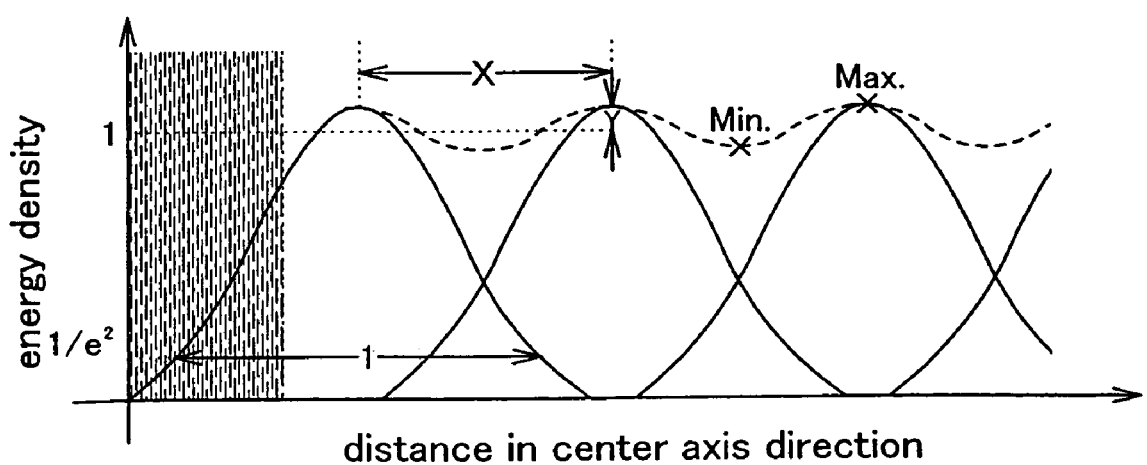
FIG. 18 shows an energy density distribution of overlapped laser lights in a center axis direction.

In FIG. 18, the energy density distribution in the center axis direction of each laser light is shown using the solid line and the energy density distribution of the synthesized laser light is shown using the broken line. In general, the value of the energy density of the laser light in the center axis direction is defined based on Gaussian distribution.

Figure 19:
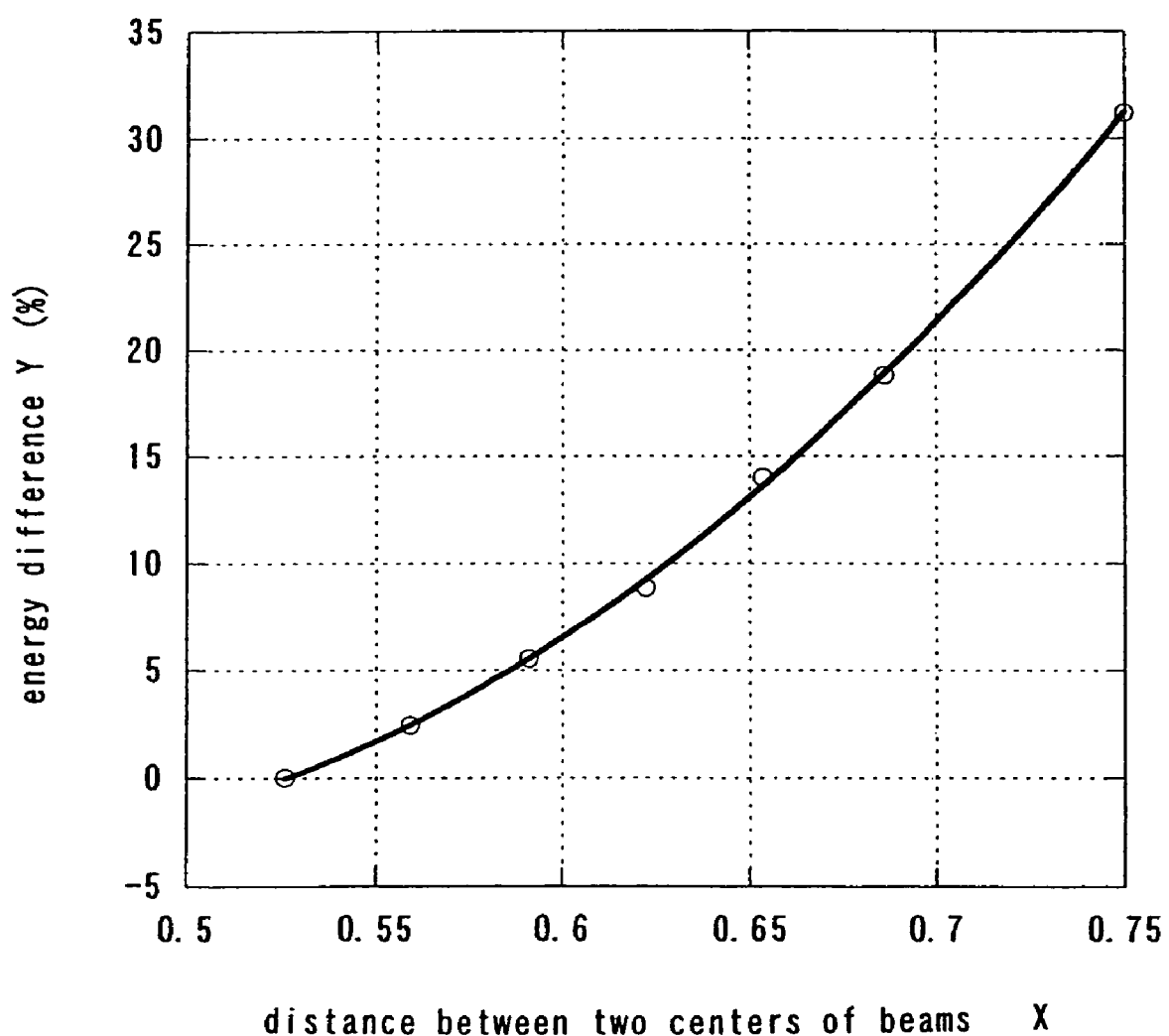
FIG. 19 shows a relation between a distance between centers of laser lights and an energy difference.

Regarding the laser lights before the synthesis, it is assumed that the distance in the center axis direction, wherein an energy density of $1/e^2$ or higher of a peak value is satisfied, is set to "1" and a distance between peaks is represented by "X". Also, a difference between the peak value and an average value of the peak value and a valley value after the synthesis is represented by "Y". A relation between "X" and "Y" obtained through a simulation is shown in FIG. 19. Note that in FIG. 19, "Y" is expressed in percentage.

In FIG. 19, an energy difference Y is expressed by Expression 1 below that is an approximate expression.

$Y=60-293X+340X^2$ (X corresponds to the larger one of two solutions)    (Expression 1)

Based on Expression 1, the following will be understood. That is, if it is desired to set the energy difference at around 5%, for instance, "X" may be set almost equal to 0.584. It is ideal that "Y" equals zero. In this case, however, the length of the laser light is shortened, so that "X" may be determined considering a balance with throughput.

Figure 20:
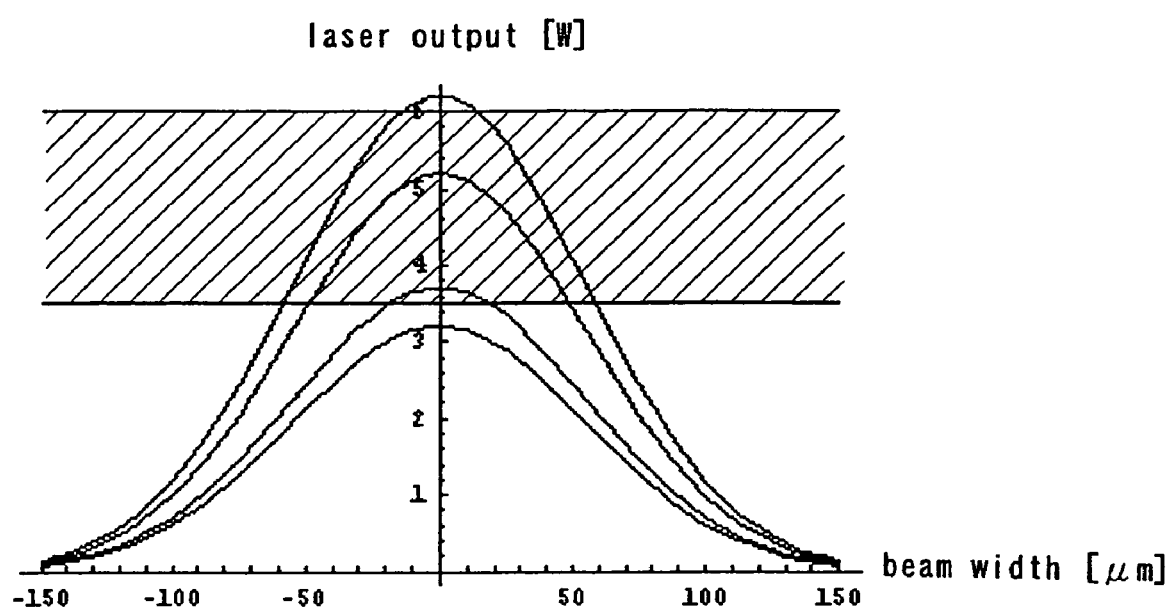
FIG. 20 shows a distribution of an output energy of a laser light in a center axis direction thereof.

Next, an allowable range of "Y" will be described. FIG. 20 shows a distribution of an output (W) of a $YVO_4$ laser with respect to a beam width in the center axis direction when the laser light has an elliptic shape. A shaded region corresponds to the range of the output energy necessary for obtaining the satisfactory crystallinity. As apparent therefrom, in this embodiment, it is sufficient that the output energy of the synthesized laser light falls within a range of 3.5 to 6 W.

When the maximum value and the minimum value of the output energy of the synthesized laser light barely fall within the output energy range necessary for obtaining the satisfactory crystallinity, the energy difference Y that enables the satisfactory crystallinity is maximized. As a result, in the case shown in FIG. 20, the energy difference Y becomes ±26.3%. Thus, it can be seen that the satisfactory crystallinity is obtained if the energy difference "Y" falls within the range described above.

It should be noted here that the range of the output energy necessary for obtaining the satisfactory crystallinity varies depending on the range of crystallinity that is judged as satisfactory. Also, the distribution of the output energy varies depending on the shape of the laser light, so that the allowable range of the energy difference Y is not necessarily limited to the above value. A designer needs to determine the range of the output energy necessary for obtaining the satisfactory crystallinity as appropriate and to set the allowable range of the energy difference Y from the distribution of the output energy of the laser to be used.

This embodiment can be implemented in combination with Embodiments 1 to 3.

Embodiment 5

In this embodiment, a description will be made with regard to a method of patterning the semiconductor film into a strip-like shape and then, scanning the laser light along the major axis direction of the strip to thereby crystallize the semiconductor film.

Figure 21A:
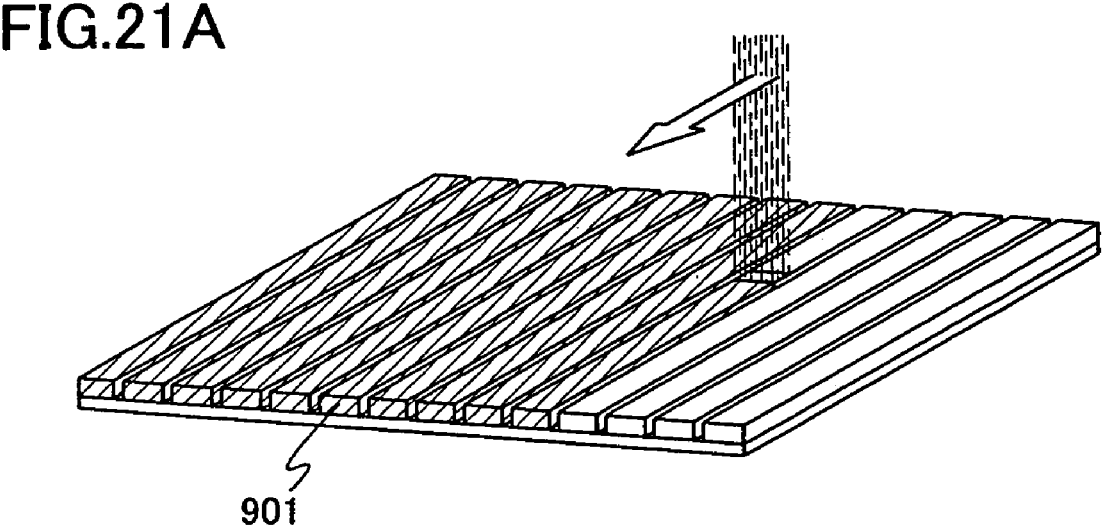
FIGS. 21A and 21B show an embodiment of a laser irradiation method of the present invention.

FIG. 21A shows how the laser light is scanned on semiconductor films 901 patterned into the strip-like shape. The scanning direction of the laser light extends along the major axis direction of the strip. Specifically, the strip-like semiconductor films 901 are formed with the width on the order of several μm to several tens of μm in the direction vertical to the major axis and laid out while being spaced apart from each other by approximately several hundreds of nm to several μm.

Further, the laser light is scanned in such a manner that the edges thereof are not made to overlap the strip-like semiconductor films but to just fall into the space between the adjacent semiconductor films. The space between the adjacent semiconductor films makes it possible to avoid thermal diffusion toward the center axis direction of the laser light upon the crystallization. Thus, the diffusion of the regions having the poor crystallinity can be suppressed to a level as low as possible, the regions being distributed in the vicinity of the edges of the irradiated laser light.

Note that, if the laser light is irradiated after patterning the semiconductor film, micro crystal develops in corner portions of the semiconductor film. For example, in the case of the pulse oscillating excimer laser, although depending on the thickness of the semiconductor film, the micro crystal having the grain size of less than 0.1 μm is observed around the corner portions of the semiconductor film in many cases. In addition, the crystal in the corner portions is likely to develop with the grain size smaller than those of the crystal grains developing in the center portion thereof. This supposedly occurs due to the difference in the way the heat applied through the laser light irradiation diffuses toward the substrate between the portions near the edges and the center portion. The micro crystal regions formed in the edge portions of the semiconductor film are narrowed as compared with the micro crystal regions formed through the irradiation of the laser light with low energy density in the area close to the edge portions and through the thermal diffusion therefrom when irradiating the laser light without patterning. In actuality, the regions regarded as being satisfactory in crystallinity to be obtained can be thus used widely.

Figure 21B:
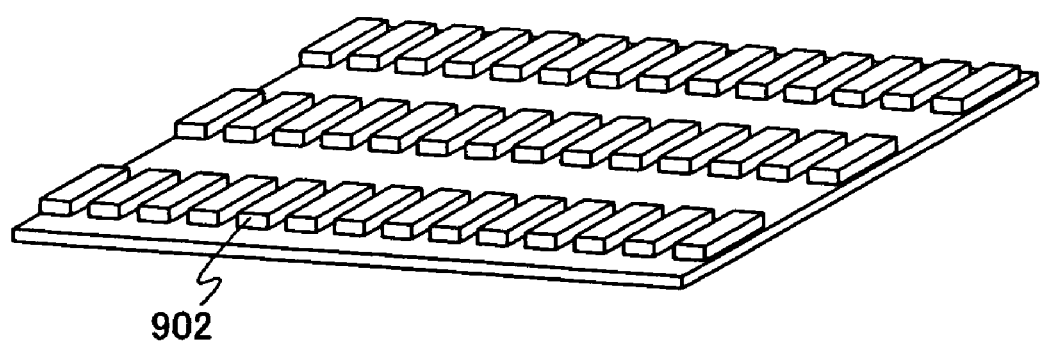

Next, as shown in FIG. 21B, after crystallizing the film through the laser light irradiation, the strip-like semiconductor films are further patterned into island-like semiconductor films 902.

Note that, unless the sufficient space between the films is secured, the strip-like semiconductor films involve the possibility that the films deform due to the gravity when being melted through the laser light irradiation to thereby cause the adhesion between the adjacent films and thus, the above effects cannot be achieved. In irradiating the laser light, however, the adhesion between the adjacent films can be avoided by causing the side on which the semiconductor films are formed to face down. Thus, the space between the adjacent strip-like semiconductor films can be more reduced.

This embodiment can be implemented freely in combination with Embodiments 1 to 4.

By synthesizing the laser lights oscillated from the plural laser oscillating apparatuses, the low energy density portions can complement each other in the laser lights. Thus, as compared with the case of using the laser lights emitted from the plural laser oscillating apparatuses independently without synthesizing the lights, the area of the laser light having the energy density high enough for the crystallization is expanded. As a result, the processing efficiency of the substrate can be enhanced.

Further, the present invention adopts a slit for partially cutting the synthesized laser light in the area having the energy density below the predetermined level in the scanning direction. With the above construction, the average value of energy densities of the laser light in the scanning direction can be increased and the laser light irradiation time at any point on the object to be processed can be reduced. Accordingly, the crystallinity of the semiconductor film can be enhanced while preventing the substrate from being excessively heated.

What is claimed is:

1. A laser irradiation method comprising:

condensing a plurality of first laser lights outputted from a plurality of first laser oscillating apparatuses through a first optical system such that the plurality of first laser lights partially overlap each other;

limiting a width of the overlapped first laser lights on an object in a movement direction on the object to be processed by using a first slit;

irradiating the object to be processed with the first laser lights having the limited width by moving the object to be processed from an upper side of the object to be processed;

condensing a plurality of second laser lights outputted from a plurality of second laser oscillating apparatuses through a second optical system such that the plurality of second laser lights partially overlap each other;

limiting a width of the overlapped second laser lights on the object in a movement direction on the object to be processed by using a second slit; and irradiating the object to be processed with the second laser lights having the limited width by moving the object to be processed from a lower side of the object to be processed simultaneously with the first laser lights.

2. A laser irradiation method comprising:

condensing a plurality of first laser lights outputted from a plurality of first laser oscillating apparatuses through a first optical system such that the plurality of first laser lights partially overlap each other so as to make centers of the laser lights draw a straight line;

limiting a width of the overlapped first laser lights on an object in a movement direction on the object to be processed by using a first slit;

irradiating the object to be processed with the first laser lights having the limited width by moving the object to be processed from an upper side of the object to be processed, condensing a plurality of second laser lights outputted from a plurality of second laser oscillating apparatuses through a second optical system such that the plurality of second laser lights partially overlap each other;

limiting a width of the overlapped second laser lights on the object in a movement direction on the object to be processed by using a second slit; and irradiating the object to be processed with the second laser lights having the limited width by moving the object to be processed from a lower side of the object to be processed simultaneously with the first laser lights.

3. A laser irradiation method comprising:
condensing a plurality of first laser lights outputted from a plurality of first laser oscillating apparatuses through a first optical system such that the plurality of first laser lights partially overlap each other so as to make major axes of the laser lights draw a straight line;
limiting a width of the overlapped first laser lights on an object in a movement direction on the object to be processed by using a first slit;
irradiating the object to be processed with the first laser light having the limited width by moving the object to be processed from an upper side of the object to be processed,
condensing a plurality of second laser lights outputted from a plurality of second laser oscillating apparatuses through a second optical system such that the plurality of second laser lights partially overlap each other;
limiting a width of the overlapped second laser lights on the object in a movement direction on the object to be processed by using a second slit; and
irradiating the object to be processed with the second laser lights having the limited width by moving the object to be processed from a lower side of the object to be processed simultaneously with the first laser lights.

4. A laser irradiation method according to claim 2, wherein the straight line which the centers draw is at an angle of 10° or more and 80° or less with a direction in which the object to be processed moves.

5. A laser irradiation method according to claim 3, wherein the straight line which the major axes draw is at an angle of 10° or more and 80° or less with a direction in which the object to be processed moves.

6. A laser irradiation method according to claim 2, wherein the straight line which the centers draw is almost at right angles with a direction in which the object moves.

7. A laser irradiation method according to claim 3, wherein the straight line which the major axes draw is almost at right angles with a direction in which the object moves.

8. A laser irradiation method according to claim 1, wherein laser light irradiation takes place in one of a reduced pressure atmosphere and an inert gas atmosphere.

9. A laser irradiation method according to claim 2, wherein laser light irradiation takes place in one of a reduced pressure atmosphere and an inert gas atmosphere.

10. A laser irradiation method according to claim 3, wherein laser light irradiation takes place in one of a reduced pressure atmosphere and an inert gas atmosphere.

11. A laser irradiation method according to claim 1, wherein the laser light comprises a continuous wave laser light.

12. A laser irradiation method according to claim 2, wherein the laser light comprises a continuous wave laser light.

13. A laser irradiation method according to claim 3, wherein the laser light comprises a continuous wave laser light.

14. A laser irradiation method according to claim 1, wherein each of the laser oscillating apparatuses is one selected from the group consisting of a YAG laser, a $YVO_4$ laser, a YLF laser, a $YAlO_3$ laser, a glass laser, a ruby laser, an alexandrite laser, a Ti: sapphire laser and a $Y_2O_3$ laser.

15. A laser irradiation method according to claim 2, wherein each of the laser oscillating apparatuses is one selected from the group consisting of a YAG laser, a $YVO_4$ laser, a YLF laser, a $YAlO_3$ laser, a glass laser, a ruby laser, an alexandrite laser, a Ti: sapphire laser and a $Y_2O_3$ laser.

16. A laser irradiation method according to claim 3, wherein each of the laser oscillating apparatuses is one selected from the group consisting of a YAG laser, a $YVO_4$ laser, a YLF laser, a $YAlO_3$ laser, a glass laser, a ruby laser, an alexandrite laser, a Ti: sapphire laser and a $Y_2O_3$ laser.

17. A laser irradiation method according to claim 1, wherein the laser light comprises a second harmonic.

18. A laser irradiation method according to claim 2, wherein the laser light comprises a second harmonic.

19. A laser irradiation method according to claim 3, wherein the laser light comprises a second harmonic.

20. A laser irradiation method according to claim 1, wherein the number of laser oscillating apparatuses is 2 or more and 8 or less.

21. A laser irradiation method according to claim 2, wherein the number of laser oscillating apparatuses is 2 or more and 8 or less.

22. A laser irradiation method according to claim 3, wherein the number of laser oscillating apparatuses is 2 or more and 8 or less.

23. A laser irradiation method according to claim 1, wherein the laser light irradiation takes place using an SLS method.

24. A laser irradiation method according to claim 2, wherein the laser light irradiation takes place using an SLS method.

25. A laser irradiation method according to claim 3, wherein the laser light irradiation takes place using an SLS method.

* * * * *